US010000584B2

(12) United States Patent
Liu et al.

(10) Patent No.: US 10,000,584 B2
(45) Date of Patent: *Jun. 19, 2018

(54) HYDROGENATION OF NITRILE RUBBER

(71) Applicant: ARLANXEO DEUTSCHLAND GMBH, Dormagen (DE)

(72) Inventors: Qingchun Liu, Shandong (CN); Zhenli Wei, Shandong (CN); Martin Hoch, Shandong (CN)

(73) Assignee: ARLANXEO DEUTSCHLAND GMBH, Dormagen (DE)

( * ) Notice: Subject to any disclaimer, the term of this patent is extended or adjusted under 35 U.S.C. 154(b) by 86 days.

This patent is subject to a terminal disclaimer.

(21) Appl. No.: 14/397,050

(22) PCT Filed: Apr. 26, 2013

(86) PCT No.: PCT/EP2013/058802
§ 371 (c)(1),
(2) Date: Oct. 27, 2014

(87) PCT Pub. No.: WO2013/160470
PCT Pub. Date: Oct. 31, 2013

(65) Prior Publication Data
US 2015/0119530 A1 Apr. 30, 2015

(30) Foreign Application Priority Data
Apr. 28, 2012 (WO) ................ PCT/CN2012/074935

(51) Int. Cl.
*C08C 19/02* (2006.01)
*C08F 236/12* (2006.01)
*C08L 15/00* (2006.01)

(52) U.S. Cl.
CPC ............ *C08C 19/02* (2013.01); *C08F 236/12* (2013.01); *C08L 15/005* (2013.01)

(58) Field of Classification Search
CPC ....... C08C 19/02; C08L 15/005; C08F 236/12
See application file for complete search history.

(56) References Cited

U.S. PATENT DOCUMENTS

| | | |
|---|---|---|
| 3,700,637 A | 10/1972 | Finch, Jr. |
| 4,464,515 A | 8/1984 | Rempel et al. |
| 4,503,196 A | 3/1985 | Rempel et al. |
| 4,581,417 A | 4/1986 | Buding et al. |
| 4,631,315 A | 12/1986 | Buding et al. |
| 4,746,707 A | 5/1988 | Fiedler et al. |
| 4,795,788 A | 1/1989 | Himmler et al. |
| 4,816,525 A | 3/1989 | Rempel et al. |
| 5,057,581 A * | 10/1991 | Rempel ................... C08C 19/02 525/329.3 |
| 5,075,388 A | 12/1991 | Rempel et al. |
| 5,208,296 A | 5/1993 | Rempel et al. |
| 5,210,151 A | 5/1993 | Rempel et al. |
| 5,241,013 A | 8/1993 | Rempel et al. |
| 5,258,467 A | 11/1993 | Rempel et al. |
| RE34,548 E | 2/1994 | Fiedler et al. |
| 6,838,489 B2 | 1/2005 | Bell et al. |
| 9,079,979 B2 | 7/2015 | Ong et al. |
| 9,150,669 B2 | 10/2015 | Ong et al. |

FOREIGN PATENT DOCUMENTS

| | | |
|---|---|---|
| CA | 2015804 | 10/1996 |
| DE | 2539132 A1 | 3/1977 |
| EP | 0471250 A1 | 2/1992 |
| EP | 2289620 A1 | 8/2009 |
| JP | 4252068 A | 9/1992 |
| WO | 2005080456 A1 | 9/2005 |
| WO | 2011079799 A1 | 7/2011 |
| WO | 2013160470 A1 | 10/2013 |

OTHER PUBLICATIONS

Dharmasena et al., Organometallics 24 (2005) 1056-1058.*
https://en.wikipedia.org/wiki/Nitrile_rubber; Jan. 2017.*
Lee et al., Organometallics 20 (2001) 794-797.*
Martin, P., "A Detailed Study of the Hydrogenation of Nitrile—Butadiene Rubber and Other Substrates Catalyzed by Ru(II) Complexes", Journal of Molecular Catalysis A: Chemical 126, 1997, Department of Chemical Engineering, University of Waterloo, Waterloo, Ont. Canada, N2L 3GI, pp. 115-131.
Drouin, S., "Multiple Tandem Catalysis: Facile Cycling Between Hydrogenation and Metathesis Chemistry", Organometallics, vol. 20, No. 26, Dec. 24, 2001, America Chemical Society, Publication, Center for Catalysis Innovation and Research, Department of Chemistry, University of Ottawa, Ottawa, Ontario, Canada K1N 6N5. pp. 5495-5497.
Camm, K.D. "Tandem ROMP-Hydrogenation with a Third-Generation Grubbs Catalyst", American Chemical Society, 2007, Journal of American Chemical Society, 2007, 129, Center for Catalysis Innovation and Research, Department of Chemistry, University of Ottawa, Ottawa, Ontario, Canada K1N 6N5. pp. 4168-4169.
Drouin, S. "Hydrogenolysis of a Ruthenium Carbene Complex to Yield Dihydride-Dihydrogen Tautomers: Mechanistic Implications for Tandem ROMP-Hydrogenation Catalysis", American Chemical Society, Inorg. Chem., 2000, 39, Center for Catalysis Innovation and Research, Department of Chemistry, University of Ottawa, Ottawa, Ontario, Canada KiN 6N5. pp. 5412-5414.
Muller, L.A. "Two-Phase Catalytic NBR Hydrogenation by RuHCl(CO)(PCy3)2 immobilized in 1-butyl-methylimidazolium Tetrafluoroborate Molten Salt", Macromol. Rapid Commun. 19, Wiley-VCH Verlag GmbH, D-69451 Weinheim, 1998, pp. 409-411.
Dharmasena, U.L. "N-Heterocyclic Carbenes as Activiating Ligands for Hydrogenation and Isomerization of Unactivated Olefins", Organometallics, 2005, 24, American Chemical Society, Center for Catalysis Innovation and Research, Department of Chemistry, University of Ottawa, Ottawa, Ontario, Canada KiN 6N5, pp. 1056-1058.

(Continued)

*Primary Examiner* — Roberto Rabago

(57) ABSTRACT

This invention relates to a novel process for selectively hydrogenating nitrile rubbers in the presence of specific Ruthenium based complex catalysts without simultaneous molecular weight degradation by a metathetic reaction.

14 Claims, 4 Drawing Sheets

(56) References Cited

OTHER PUBLICATIONS

Kongparakul, S. "Metathesis Hydrogenation of Natural Rubber Latex", Applied Catalysis A: General 405, 2011, Elsevier B.V., ScienceDirect, pp. 129-136.

Trnka, T.M. "Synthesis and Activity of Ruthenium Alkylidene Complexes Coordinated with Phosphine and N-Heterocyclic Carbene Ligands", J. A. Chem. Soc, 2003, 125, 'American Chemical Society, pp. 2546-2558.

Lee H.M. Catalytic Hydrogenation of Alkenes by the Ruthenium—Carbene Complex HRu(CO)Cl(PCy3)(IMes) (IMes=Bis(1,3-(2,4,6-trimethylphenyl)imidazol-2-ylidene), Department of Chemistry, University of New Orleans, New Orleans, LA, 70148 and Department of Chemistry, Marquette University, Milwaukee, WI 53201-1881. American Chemical Society, Organometallics, 2001, 20, pp. 794-797.

Parent, J.S. "OsHCl(CO)(O2)(PCy3)2-Catalyzed Hydrogenation of Acrylonitrile-Butadiene Copolymers", Ind. Eng. Chem. Res. 1998, 37, American Chemical Society, pp. 4253-4261.

Beach, N.J. "Carbonyl-Amplified Catalyst Performance: Balancing Stability Against Activity for Five-Coordinate Ruthenium Hydride and Hydridocarbonyl Catalysts", Organometallics, 2009, 28, 2, American Chemistry Society, pp. 441-447.

Gandolfit,C., "Chelating NHC Ruthenium(II) Complexes as Robust Homogeneous Hydrogenation Catalysts", Organometallics, 2009, 28, (17) American Chemical Society, pp. 5112-5121.

Horn, S., "Transfer Hydrogenation of Ketones and Activated Olefins Using Chelating NHC Ruthenium Complexes", European Journal of Inorganic Chemistry 2011, 18, School of Chemistry & Chemical Biology, University of College Dublin, Belfield, Dublin 4, Ireland, pp. 2863-2868.

Hintermann, L. Expedient Syntheses of the N-heterocyclic Carbene Precursor Imidazolium Salts IPr—HCl, IMES-HCl and IXy-HCl, Beilstein Journal of Organic Chemistry 2007, 3, No. 22, Institute of Organic Chemistry, Aachen, Germany, pp. 1-5.

Kuhn, K.M. "A Facile Preparation of Imidazolinium Chlorides", Org Lett., May 15, 2008; 10 (10), The Arnold and Mabel Beckman Laboratory of Chemical Synthesis Division of Chemistry and Chemical Engineering, California Institute of Technology, Pasadena, California, 91125, pp. 2075-2077.

Strassberger, Z. "A Facile Route to Ruthenium-Carbene Complexes and Their Application in Furfural Hydrogenation", Appl. Organometal.Chem, 2010, 24,, Wiley & Sons, Wiley Interscience. pp. 142-146.

Beach, N.J. "Improved Syntheses of Versatile Ruthenimum Hydridocarbonyl Catalysts Containing Electron-Rich Acillary Ligands", Centre for Catalysis Research and Innovation, Department of Chemistry, University of Ottawa, Ottawa, ON, Canada K1N 6N5, Adv., Synth., Catal., 2008, 350, pp. 773-777, Wiley VCH Verlag GmbH & Co., KGaA, Weinheim.

Arduengo III, A.J. "A Stable Crystalline Carbene", Central Research and Development Department, Wilmington, Delaware 19880-0328., pp. 361-363, 1991.

International Search Report from co-pending Application PCT/EP2013/058802 dated Jul. 16, 2013, 3 pages.

\* cited by examiner

HYDROGENATION OF NITRILE RUBBER

FIELD OF THE INVENTION

This invention relates to a novel process for selectively hydrogenating nitrile rubber in the presence of specific complex catalysts.

BACKGROUND OF THE INVENTION

The term "acrylonitrile-butadiene rubber" or "nitrile rubber", also named as "NBR" for short, shall be interpreted broadly and refers to rubbers which are copolymers or terpolymers of at least one α,β-unsaturated nitrile, at least one conjugated diene and, if desired, one or more further copolymerizable monomers.

Hydrogenated NBR, also referred to as "HNBR" for short, is produced commercially by hydrogenation of NBR. Accordingly, the selective hydrogenation of the carbon-carbon double bonds in the diene-based polymer must be conducted without affecting the nitrile groups and other functional groups (such as carboxyl groups when other copolymerizable monomers were introduced into the polymer chains) in the polymer chains.

HNBR is a specialty rubber which has very good heat resistance, an excellent resistance to ozone and chemicals and also an excellent oil resistance. The abovementioned physical and chemical properties of HNBR are associated with very good mechanical properties, in particular a high abrasion resistance. For this reason, HNBR has found wide use in a variety of applications. HNBR is used, for example, for seals, hoses, belts and damping elements in the automobile sector, also for stators, oil well seals and valve seals in the field of oil exploration and also for numerous parts in the aircraft industry, the electronics industry, mechanical engineering and shipbuilding. A hydrogenation conversion higher than 95%, or a residual double bond (RDB) content <5%, without cross-linking during the hydrogenation reaction and a gel level of less than about 2.5% in the resultant HNBR is a threshold that ensures said high-performance applications of HNBR and guarantees excellent processability of the final product.

The degree of hydrogenation of the copolymerized diene units in HNBR may vary in the range from 50 to 100% with the desired hydrogenation degree being from about 80 to 100%, preferably from about 90 to about 99.9%. Commercial grades of HNBR typically have a remaining level of unsaturation below 18% and a content of acrylonitrile of roughly up to about 50%.

It is possible to carry out the hydrogenation of NBR either with homogeneous or with heterogeneous hydrogenation catalysts. The catalysts used are usually based on rhodium, ruthenium or palladium, but it is also possible to use platinum, iridium, rhenium, osmium, cobalt or copper either as metal or preferably in the form of metal compounds (see e.g. U.S. Pat. No. 3,700,637, EP-A-0 134 023, DE-A-35 41 689, DE-A-35 40 918, EP-A-0 298 386, DE-A-35 29 252, DE-A-34 33 392, U.S. Pat. No. 4,464,515 and U.S. Pat. No. 4,503,196). Suitable catalysts and solvents for a hydrogenation in the homogeneous phase are also known from DE-A-25 39 132 and EP-A-0 471 250.

For commercial purposes the hydrogenation of NBR is performed in organic solvents by using either a heterogeneous or a homogeneous transition metal catalyst often based on rhodium or palladium. Such processes suffer from drawbacks such as high prices for the catalyst metals and the cost involved in catalyst metal removal/recycle. This has led to research and development of alternative catalysts based on cheaper noble metals, such as osmium and ruthenium.

Alternative NBR hydrogenation processes can be performed using Os-based catalysts. One catalyst well suited for NBR hydrogenation is $OsHCl(CO)(O_2)(PCy_3)_2$ as described in Ind. Eng. Chem. Res., 1998, 37(11), 4253-4261). The rates of hydrogenation using this catalyst are superior to those produced by Wilkinson's catalyst ($RhCl(PPh_3)_3$) over the entire range of reaction conditions studied.

Ru-based complexes of the type $Ru(X)Cl(CO)L_2$ with X meaning H or CH=CHPh are also good catalysts for polymer hydrogenation in solution and the price for Ru metal is lower. $RuHCl(CO)L_2$ (L being a bulky phosphine) catalyst systems lead to quantitative hydrogenation of NBR as disclosed in Journal of Molecular Catalysis A: Chemical, 1997, 126(2-3), 115-131. During such hydrogenation it is not necessary to add a free phosphine ligand to maintain the catalyst activity. However, GPC results indicate that these catalysts cause a certain degree of cross-linking during hydrogenation and the HNBR obtained is prone to gel formation.

In EP-A-0 298 386 ruthenium complexes are used for the hydrogenation of nitrile rubber but various additives or ligands such as phosphines or carboxylic acids have to be added to avoid gel formation.

In EP-A-0 588 099 ruthenium based complexes are described of the type $RuXY(CO)ZL_2$ where X, Y, Z and L can be halides, CO, carboxylates, or phosphines for the hydrogenation of nitrile rubber, however, the addition of water and certain additives is necessary to prevent excessive increase of molecular weight during hydrogenation. This, however, is not satisfying as the introduction of water causes corrosion in industrial scale equipment and additives are typically not desired as contaminants in the final rubber product. The amount of catalysts used is reported to be ca. 500 ppm or 0.05 parts by weight catalyst per 100 parts by weight of rubber.

Likewise, EP-A-0 588 098 and EP-A-0 588 096 use inorganic additives such as salts and acids like sulfuric and phosphoric acid for the same purpose together with traces of water which must be considered as being severely corrosive which in turn makes the use of expensive alloys for all the hydrogenation facility necessary. The amounts of catalyst needed vary from 923 to 1013 ppm based on Ru metal relative to rubber in EP-A-0 588 096 and approximately 100 ppm Ru metal in EP-A-0 588 098.

In EP-A-0 588 097 the catalysts $RuCl_2(PPh_3)_2$ and $RuHCl(CO)(PCy_3)_2$ are used for the nitrile rubber hydrogenation in MEK solution. However, the obtained products are gelled unless a relatively high amount (ca. 5 phr) of ascorbic acid is added. In further examples the addition of various organic acids or dibasic acids is described but no solution is offered to the problem of a possible contamination of the final product with these additives. The amount of catalyst used is reported to be from 229 to 1052 ppm Ru metal per 100 parts by weight rubber.

EP-A-0 490 134 mentions a general problem associated with Ru-catalysts, namely the increase of viscosity during the hydrogenation. This problems tends to be dependent on the solvent used and has been associated to the interaction of two or more polymer molecules although concrete reaction mechanisms have not been established. Higher catalyst loadings also tend to cause higher viscosities or even gelling. It was found that amines added during the hydrogenation process in levels of 0.1 to 0.3 phr can avoid viscosity built-up. However, in view of large scale commercial processes one has to consider that additives can either built-up in the necessary solvent recycling processes or can be carried over into the product. Especially when using HNBR for peroxide cured rubber articles interference with the curing system can create serious drawbacks. Primary amines such as those found effective in EP-A-0 490 134 can reduce the cure state and as a consequence worsen the important compression set for example.

While some applications of HNBR may not be sensitive to the presence of additives such as for industrial applications there are also applications subject to government health and safety regulations which in general tend to favor cleaner polymers or polymers containing less additives. For practical reasons it is very desirable to run the same catalyst system in a plant for all designated products and a simpler catalyst system without additives may allow to produce products both for industrial and for regulated applications. Hence a catalyst system which does not need to be accompanied with additives would be much more desirable from the process and the rubber users point of view. It is furtheron desirable that a catalyst allows a good control of molecular weight during hydrogenation and a reproducible and sufficiently heat stable polymer. Additionally higher catalyst efficiencies are also desirable as precious metals such as Palladium, Rhodium, Iridium, Platinum and Ruthenium are expensive.

Various Ruthenium catalyst compositions have been proposed which can be used for both, the metathesis as well as the hydrogenation of nitrile rubber.

In WO-A-2005/080456 the preparation of HNBR having low molecular weights and narrower molecular weight distributions than those known in the art is carried out by simultaneously subjecting the nitrile rubber to a metathesis reaction and a hydrogenation reaction. The reaction takes place in the presence of a Ruthenium- or Osmium-based penta-coordinated complex catalyst, in particular 1,3-bis(2,4,6-trimethylphenyl)-2-imidazolidinylidene) (tricyclohexylphosphine) ruthenium (phenylmethylene) dichloride (also called Grubbs 2$^{nd}$ generation catalyst). However, WO-A-2005/080456 does not provide any disclosure or teaching how to influence these two simultaneously occurring reactions, i.e. metathesis and hydrogenation or how to control the activity of the respective catalysts in this regard. Provided these catalysts can be used in hydrogenation processes with controlled or suppressed metathesis activity and therefore provide controlled or suppressed molecular weight reduction they still possess structures of considerable complexity. In particular the presence of substituted benzylidene ligands adds further synthesis steps to the catalyst manufacture and thus increases the manufacturing costs.

WO-A-2011/029732 also discloses an alternative process for subjecting a nitrile rubber in the presence of hydrogen to a combined and simultaneous metathesis and hydrogenation reaction in the presence of specifically defined penta-coordinated Ruthenium- or Osmium-based catalysts in order to prepare hydrogenated nitrile rubbers having low molecular weights and a narrow molecular weight distribution. In particular the so-called Hoveyda catalyst and the Arlt catalyst as shown hereinafter are used and turn out to be efficient at levels of 0.041 phr and 0.045 phr, respectively, in typical nitrile hydrogenation experiments.

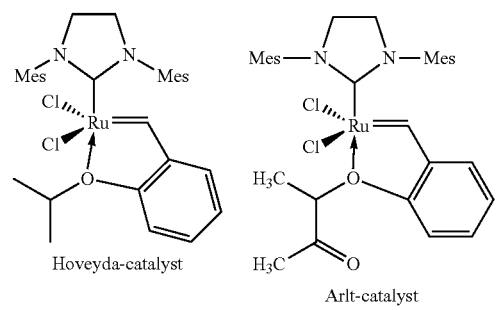

Hoveyda-catalyst

Arlt-catalyst

Still, these catalysts contain two relatively complex carbene ligands, namely a benzylidene ligand and an unsubstituted or substituted imidazolidinyl ligand bound to the Ru-atom like a carbene complex. Apart from the challenging synthesis procedures the metathetic activity of the catalysts during hydrogenation is not always desirable.

WO-A-2011/023788 also discloses a process for subjecting a nitrile rubber in the presence of hydrogen to a combined and simultaneous metathesis and hydrogenation reaction in the presence of specifically defined hexa-coordinated Ruthenium- or Osmium based catalysts to prepare HNBR having lower molecular weights and narrower molecular weight distributions than those known in the art. Such process is performed by using a catalyst of general formulae (I) to (III)

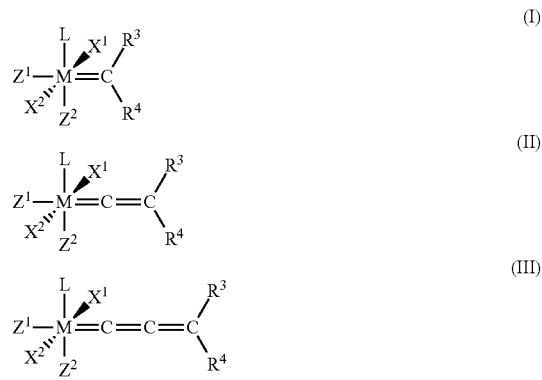

where
M is ruthenium or osmium,
$X^1$ and $X^2$ are identical or different ligands, preferably anionic ligands,
$Z^1$ and $Z^2$ are identical or different and neutral electron donor ligands,
$R^3$ and $R^4$ are each independently H or a substituent selected from the group consisting of alkyl, cycloalkyl, alkenyl, alkynyl, aryl, carboxylate, alkoxy, alkenyloxy, alkynyloxy, aryl-oxy, alkoxycarbonyl, alkylamino, alkylthio, arylthio, alkylsulphonyl and alkyl-sulphinyl residues, each of which may optionally be substituted by one or more alkyl, halogen, alkoxy, aryl or heteroaryl moities, and
L is a ligand.

Grubbs III catalyst as shown below is used as preferred catalyst, which contains both, a benzylidene ligand and a carbene ligand of the NHC type and thus these catalysts are not as easy accessible as desired.

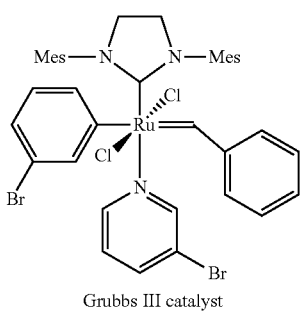

Grubbs III catalyst

WO-A-2011/079799 discloses a broad variety of catalysts the general structure of which is shown hereinafter

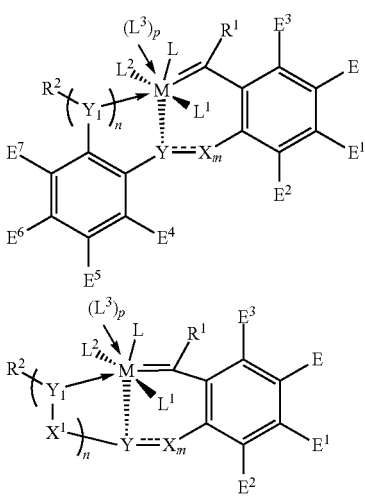

It is stated that such catalysts can be used to provide modified nitrile butadiene rubber (NBR) or styrene-butadiene rubber (SBR) by depolymerisation. It is further stated that the catalysts can be used in a method of making a depolymerized HNBR or SBR rubber by adding one or more of those catalysts first to carry out depolymerisation of NBR, followed by adding hydrogen into the reactor under high pressure for hydrogenation. In another embodiment it is disclosed to prepare HNBR by adding hydrogen under high pressure first, then followed by adding one or more of the above catalysts. However, WO-A-2011/079799 does not provide any disclosure or teaching how to influence the different catalytic activities of the catalysts for depolymerisation (metathesis) and hydrogenation. It is accepted that while hydrogenation takes place simultaneously metathesis leads to a degradation of the molecular weight in uncontrolled manner.

A number of further references describe the use of metathesis catalysts in two step reactions starting with a ring-opening metathesis polymerisation (ROMP) first which is followed by a hydrogenation reaction (so called "tandem polymerization/hydrogenation reactions").

According to Organometallics, 2001, 20(26), 5495-5497 the metathesis catalyst Grubbs I catalyst, namely $RuCl_2(PCy_3)_2$-benzylidene can be used for ROMP of cyclooctene or a norbornene derivative first, then followed by a hydrogenation of the polymers. It is reported that the addition of a base like triethylamine increases the catalytic activity in the hydrogenation reaction. Hence, this catalyst still has the disadvantage of needing an additive and in general, this catalyst being the first generation of the Grubbs catalysts has an overall too low activity.

J. Am. Chem. Soc 2007, 129, 4168-9 also relates to tandem ROMP-hydrogenation reactions starting from functionalized norbornene monomers and compares the use of three Ruthenium-based catalysts, i.e. Grubbs I, Grubbs II and Grubbs III catalysts in such tandem reactions. It is described that the Ruthenium-based catalyst on the end of the polymer backbone is liberated and transformed into a hydrogenation-active species through reaction with $H_2$, a base like triethylamine, and methanol. Hence the reaction suffers the same drawback as disclosed in Organometallics, 2001, 20(26), 5495-5497.

Inorg. Chem 2000, 39, 5412-14 also explores tandem ROMP polymerization/hydrogenation reactions and focuses on the mechanism of the hydrogenolysis of the ruthenium-based metathesis catalyst Grubbs I. It is shown that such catalyst is transformed into dihydride, dihydrogen and hydride species under conditions relevant to hydrogenation chemistry. However, there is no disclosure at all about hydrogenation of unsaturated polymers.

Summarizing the above it becomes clear that (1) up to now, hydrogenation catalysts which are very active for the selective hydrogenation of nitrile rubbers are known and Rh- and Pd-based catalysts are already used in industrial hydrogenation processes; however, cheaper Ru-based hydrogenation catalysts are still facing the gel formation problem when used for NBR hydrogenation.

(2) some Ruthenium based complexes which are designed for high activity in metathesis reactions allow the degradation of nitrile rubber by metathesis first which may then be followed by a hydrogenation of the degraded nitrile rubber to afford hydrogenated nitrile rubber; if the same catalyst is used for metathesis and for hydrogenation, such catalysts are highly active for NBR metathesis while not so active for NBR hydrogenation at the same time; and (3) catalysts which possess both, i.e. catalytic activity for metathesis and hydrogenation, could not be used in a controlled manner so far.

In four patent applications of the same applicant not yet published novel catalyst compositions based on Ruthenium have been described as obtainable by contacting complex catalysts originally disposing of both, metathetic and hydrogenation activity, with different co-catalysts, thereby controlling or even destroying the metathetic activity in order to selectively hydrogenate nitrile rubbers. However, as the preparation of such catalyst compositions includes an additional preparation step there is still a need to provide further improved yet simple enough catalysts allowing a selective hydrogenation of nitrile rubber at low catalyst concentrations.

EP-A-0 298 386 discloses a simple catalyst structure with a so called N-heterocyclic carbene ligand as it is e.g. present in Grubbs II or Grubbs III catalyst or Grubbs-Hoveyda catalyst.

Ruthenium complexes as shown in the below formula have been prepared for the first time and tested for 1-hexene hydrogenation by Nolan et al (Organometallics 2001, 20, 794) and the $RuHCl(CO)IMes(PCy_3)$ catalyst was found to be less active than the simpler $RuHCl(CO)(PCy_3)_2$ wherein Cy means cyclohexyl. This reference, however, does not provide any disclosure, hint or teaching whether such complexes may be also used for hydrogenating polymers, in particular nitrile rubbers and if the use of $RuHCl(CO)IMes(PCy_3)$ as catalyst compared to the use of $RuHCl(CO)$ (PCy$_3$)$_2$ as catalyst has any impact on or benefit for the physical properties of any hydrogenated nitrile rubbers obtained thereby.

Fogg et al. (Organometallics 2005, 24, 1056-1058) prepared the complexes RuHCl(CO)(PPh$_3$)NHC with NHC=IMes or SIMes by reaction of the precursor RuHCl(CO)(PPh$_3$)$_3$ with the respective NHC-ligand.

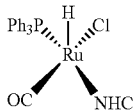

NHC = IMes or SIMes

Hydrogenation trials with cyclooctene revealed a good hydrogenation efficiency for this catalyst with NHC=IMes (IMes being N,N'-bis(mesityl)imidazol-2-ylidene) but as a side reaction also ca. 20% of a ROMP-polymer were found which indicates that this catalyst or a derived active species have metathesis activity. This in turn implies that a hydrogenation of diene-polymers would be accompanied by molecular weight degradation as this process proceeds through metathesis steps. While this is beneficial for the purpose of generating lower molecular weight rubbers it is a serious drawback for a controlled preparation of hydrogenated polymers without molecular weight reduction which are necessary for many high end rubber parts. Contrary thereto no ROMP-polymerization was observed with cycldodecene as substrate to be hydrogenated. This different behaviour depending on the substrate does not allow a person skilled in the art to draw any conclusion or make any prediction about those catalysts' behaviour. Organometallics 2005, 24, 1056-1058, however, does not provide any disclosure, hint or teaching whether such complexes RuHCl(CO)(PPh$_3$)NHC may be also used for hydrogenating polymers, in particular nitrile rubbers, and if the use thereof as catalyst has any impact on or benefit for the physical properties of hydrogenated nitrile rubbers obtained thereby.

Ruthenium catalysts with NHC-ligands have been found to be very active in general but their use in direct hydrogenation has been limited as the bond between the metal and the carbon atom of the NHC ligand has been found to be susceptible to reductive elimination under reducing conditions as stated by Albrecht et al (Organometallics 2009, 28, 5112-5121). The authors further report on NHC-ligands which possess additional chelating groups which can be hemilabile in order to prevent the elimination of the NHC groups from the metal coordinating sphere. This approach worked in some cases for the styrene hydrogenation but has not been tested in the hydrogenation of unsaturated polymers. It was also found that an olefin as chelating group was in fact hydrogenated in the early stage of the hydrogenation again leaving the NHC-ligand as a mono-dentate ligand which finally was completely split-off from the complex as imidazolium-salt and the metal complexes ended up as a black solid at the end to the run.

Thus, the available academic literature actually discourages the use of Ruthenium catalysts with mono-dentate bonded NHC-ligands for the purpose of demanding hydrogenation processes.

In Macromolecular Rapid Communications 19, 409-411 it is further disclosed that nitrile rubber may be hydrogenated under two-phase conditions using RuHCl(CO)(PCy$_3$)$_2$ as catalyst which is immobilized in 1-butyl-3-methylimidazolium tetrafluoroborate molten salt.

Fogg et al (Organometallics 2009, 28, 441-447) tested the hydrogenation performance of catalysts with the formulae RuHCl(H$_2$)(PCy$_3$)(L) and RuHCl(CO)(PCy$_3$)(L) wherein L=P(Cy)$_3$ with Cy being cyclohexyl or L=IMes with IMes being N,N'-bis(mesityl)imidazol-2-ylidene for various substrates such as styrene and allyl-benzene as well as for polymers obtained by ROMP of norbornenes and derivatives thereof. Comparing the Ruthenium complexes with and without a NHC-ligand one cannot find a clear advantage for those ones with an NHC-ligand. The trials were conducted under moderate conditions such as room temperature and up to 55° C. with relatively high catalyst loadings. The hydrogenation of polymeric substrates is much more demanding compared to the hydrogenation of small molecules and results in substantially lowered turnover frequencies as well as conversions despite high/higher catalyst loadings and in the necessity of increased reaction times. Under these reaction conditions the above mentioned side-reaction of NHC-ligands are even more likely to occur.

Albrecht et al (European Journal of Inorganic Chemistry (2011), 2011(18), 2863-2868) even found that Ruthenium complexes with NHC-ligands and a cumene ligand tends to hydrogenate nitrile groups which is a reaction very undesirable and a supposed cause for gelling.

In view of these obstacles there was still a need for an improved hydrogenation of nitrile rubber with simple Ruthenium based complexes which do not require further additives. Such process should proceed in a controlled manner, i.e. without a simultaneous molecular weight degradation due to a metathesis reaction. Such process should further provide access to hydrogenated nitrile rubber having in particular medium to high molecular weight and with a range of Mooney viscosities (ML1+4@100° C.) of from 60 to 130 Mooney units and should be efficient in that low amounts of catalyst already give the necessary high conversions in short reaction times. According to prior art a catalyst removal or recycle step is so far required after the hydrogenation to remove undue high residual catalyst contents. Hence the novel process to be provided should preferably represent a leave-in-catalyst technology.

SUMMARY OF THE INVENTION

The above objects have been surprisingly solved by contacting a nitrile rubber with hydrogen in the presence of a catalyst of the following general formula (I) which contains mandatorily at least one N-heterocyclic carbene ligand and a CO ligand thereby selectively hydrogenating the C=C double bonds in the polymer backbone of the nitrile rubber.

The present invention therefore relates to a novel process for preparing partially or fully hydrogenated nitrile rubbers characterized in that a nitrile rubber is subjected to a hydrogenation in the presence of at least one complex catalyst having the general formula (I)

wherein
X$^1$ is an anionic ligand, and
L$^1$ and L$^2$ are identical or different ligands, wherein at least one of L$^1$ and L$^2$ represents a N-heterocyclic carbene ligand.

The present invention further relates to the use of a complex having the general formula (I)

wherein

X[1] is an anionic ligand, and

L[1] and L[2] are identical or different ligands, wherein at least one of L[1] and L[2] represents a N-heterocyclic carbene ligand as catalyst for partially or fully hydrogenating nitrile rubbers.

The present invention further relates to hydrogenated nitrile rubber obtainable by such novel process. In particular the invention relates to hydrogenated nitrile rubber having a benzene content of less than 100 ppm, more preferably less than 95 ppm and even more preferably less than 90 ppm.

BRIEF DESCRIPTION OF THE FIGURES

The aspects, features and advantages of this invention will become apparent from the following detailed description in conjunction with the accompanying figures showing the following.

DETAILED DESCRIPTION OF THE INVENTION

Figure 1:
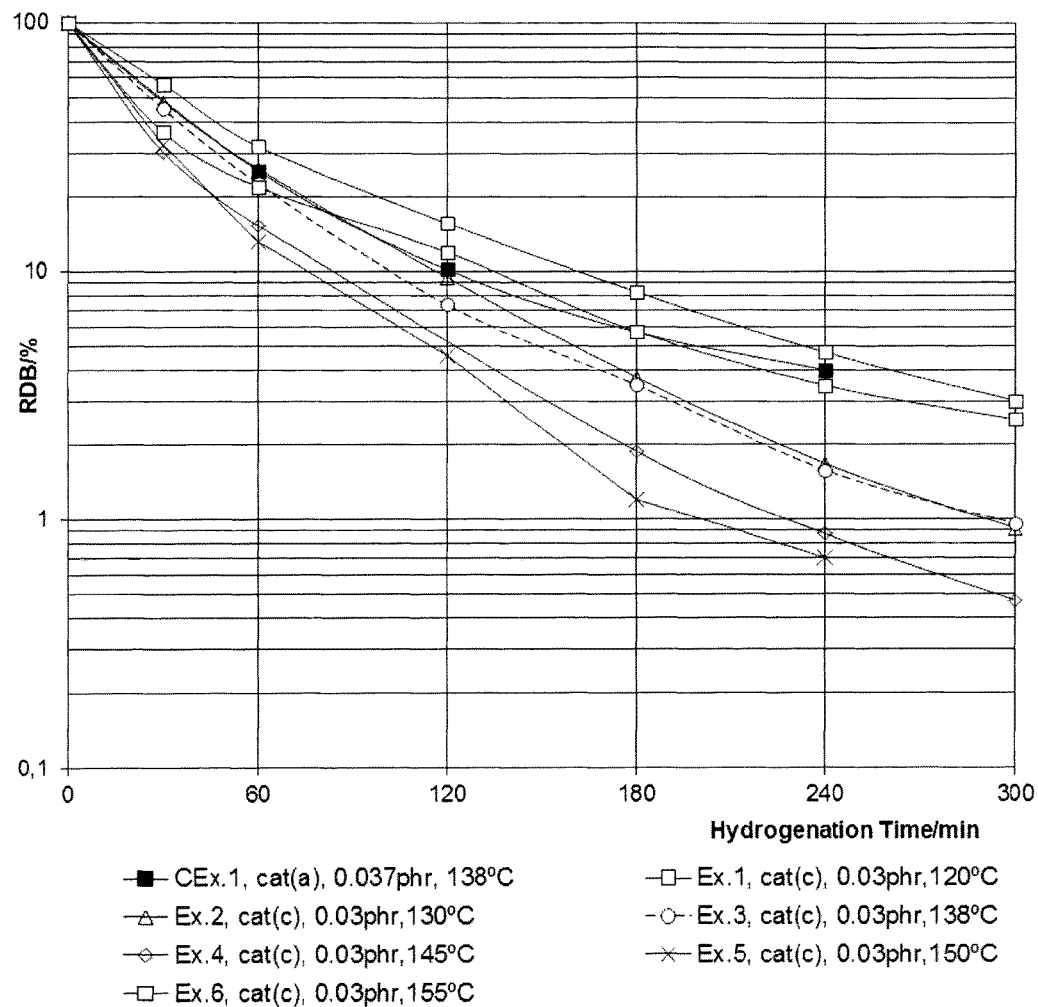
FIG. 1 shows a plot of the RDB, i.e. the remaining double bonds, versus the hydrogenation time for Comparison Example CEx.1 and Examples 1 to 6.
Figure 2:
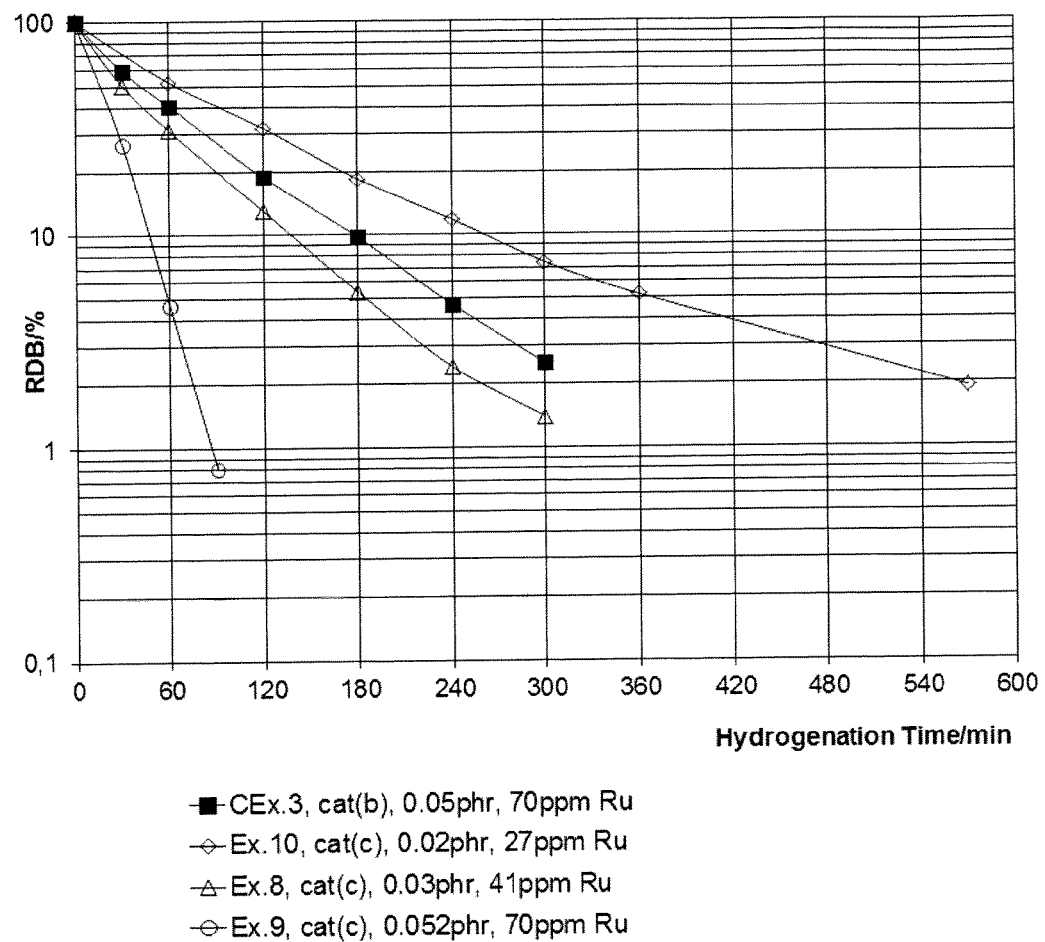
FIG. 2 shows a plot of the RDB, i.e. the remaining double bonds, versus hydrogenation time for Comparison Example CEx.3, and Examples 8 to 10.
Figure 3:
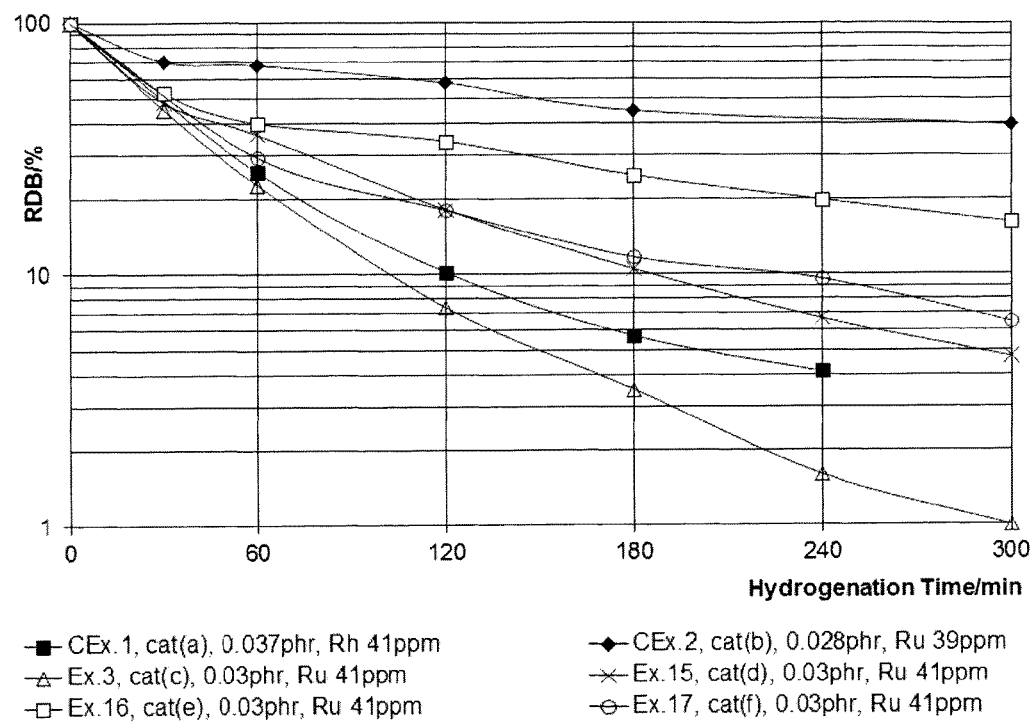
FIG. 3 shows a plot of the RDB, i.e. the remaining double bonds, versus hydrogenation time for Comparison Examples CEx.1 and CEx.2 and Example 3 and Examples 15 to 17.
Figure 4:
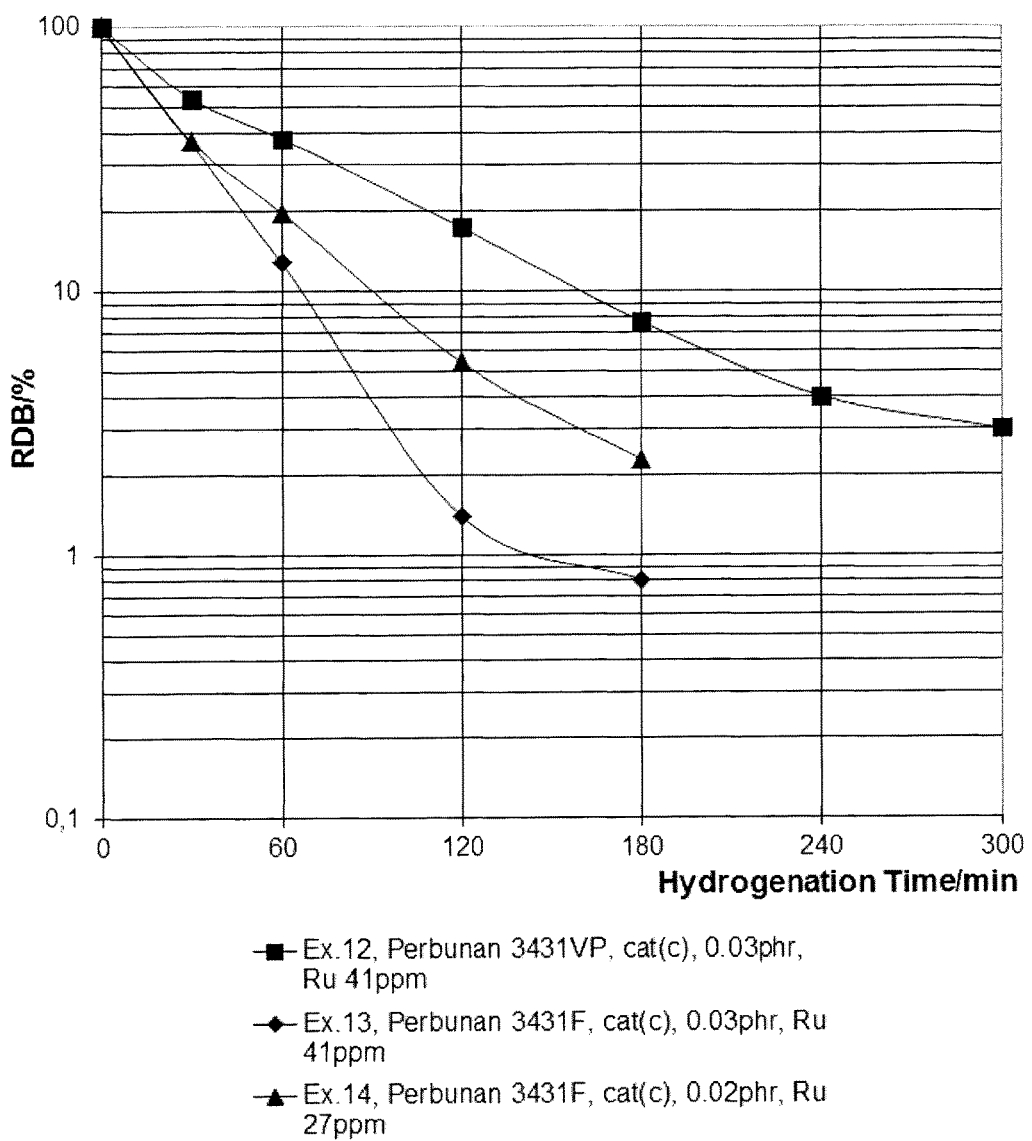
FIG. 4 shows a plot of the RDB, i.e. the remaining double bonds, versus hydrogenation time for Examples 12 to 14.

Advantageously the use of the complex catalyst according general formula (I) allows performing the hydrogenation reaction of the nitrile rubber without a simultaneous metathetic degradation of the nitrile rubber. This means that the hydrogenation of the nitrile rubber using such catalyst can be carried out in a controlled manner, i.e. under formation of hydrogenated nitrile rubber with a controllable medium to high molecular weight. The catalysts do not foster a metathesis reaction simultaneously or in competition to the hydrogenation reaction. Hence the molecular weight of the nitrile rubber does neither substantially decrease during hydrogenation nor remarkably increase. The catalyst according to general formula (I) disposes of a high activity in said hydrogenation of nitrile rubber, i.e. a high degree of hydrogenation may be achieved in adequately short reaction times and with low catalyst concentrations. Accordingly there is no need to remove or recycle the complex catalyst after the hydrogenation. The present process does not have the deficiencies of other processes according to the prior art using complex catalysts without a mandatory N-heterocyclic carbene ligand: If the catalyst according to general formula (I) is used in the hydrogenation process according to the present invention the generation of gel in the hydrogenated nitrile rubber is minimized and the Mooney viscosity increase upon heat ageing is substantially lower than so far known, in particular compared to a hydrogenation process using the closest prior art catalyst, namely $Ru(CO)HCl(PCy_3)_2$. The achievement of these favourable results regarding the physical properties when using the catalyst of general formula (I) which does not possess the structural complexity inherent for some other prior art Ruthenium catalysts reviewed above could not be foreseen by any prior art references or a person skilled in the art.

Surprisingly the process of the present invention if performed in monochlorobenzene results in hydrogenated nitrile rubber solutions disposing of a very low benzene concentration and hence—after isolation—in hydrogenated nitrile rubber having a very low benzene concentration. This is remarkable, as monochlorobenzene is known to be decomposed to yield HCl and benzene when using Wilkinson's catalyst, namely chlorotris(triphenylphosphine) rhodium(I), for NBR hydrogenation. Both, HCl known for its corrosive effect as well as benzene being a carcinogen, are undesired by-products and the present process allows to provide HNBR solutions with less than 100 ppm benzene, preferably less than 95 ppm and more preferably less than 90 ppm benzene and hence isolated HNBR with less than 100 ppm benzene, preferably less than 95 ppm and more preferably less than 90 ppm benzene. Such HNBR is obtainable by the process of the present invention performed in an organic solvend as defined below, in particular monochlorobenzene. Such low benzene amounts are highly desired for certain applications.

The term "substituted" used for the purposes of the present patent application means that a hydrogen atom on an indicated radical or atom has been replaced by one of the groups indicated in each case, with the proviso that the valency of the atom indicated is not exceeded and the substitution leads to a stable compound.

For the purposes of the present patent application and invention, all the definitions of moities, parameters or explanations given above or below in general terms or in preferred ranges can be combined with one another in any way and shall be considered as disclosed this way, i.e. including combinations of the respective ranges and preferred ranges.

Definition of the Complex Catalyst:

The catalyst to be used according to the invention has the general formula (I), $$Ru(CO)(H)(X^1)(L^1)(L^2) \qquad (I)$$

wherein

X[1] is an anionic ligand, and

L[1] and L[2] are identical or different ligands, wherein at least one of L[1] and L[2] represents a N-heterocyclic carbene ligand.

The catalyst according to general formula (I) may have the following geometry

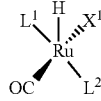

i.e. a tetragonal pyramidal geometry. While a number of catalysts do have this tetragonal pyramidal geometry, deviations from that geometry are also possible due to variations of the ligand sphere which shall also be within the scope of this invention.

Definition of L[1] and L[2]:

In the general formula (I), L[1] and L[2] are identical or different ligands at least one of which represents a N-heterocyclic carbene ligand.

In one embodiment

L[1] represents a ligand selected from the group consisting of a phosphine, sulfonated phosphine, phosphate, phosphinite, phosphonite, arsine, stibine, ether, amine, amide, sulfonate, sulfoxide, carboxyl, nitrosyl, pyridine, thioether, nitrile and isocyanide and L[2] represents a N-heterocyclic carbene ligand.

In an alternative embodiment both ligands $L^1$ and $L^2$ represent an identical or different N-heterocyclic carbene ligand.

If $L^1$ represents a phosphine, sulfonated phosphine, phosphate, phosphinite, phosphonite, arsine, stibine, ether, amine, amide, sulfonate, sulfoxide, carboxyl, nitrosyl, pyridine-based ligands, or thioether the following ligands can be typically used:

The term "phosphinite" includes, for example, phenyl diphenylphosphinite, cyclohexyl dicyclohexylphosphinite, isopropyl diisopropylphosphinite and methyl diphenylphosphinite The term "phosphite" includes, for example, triphenyl phosphite, tricyclohexyl phosphite, tri-tert-butyl phosphite, triisopropyl phosphite and methyl diphenyl phosphite.

The term "stibine" includes, for example, triphenylstibine, tricyclohexylstibine and trimethylstibine.

The term "sulfonate" includes, for example, trifluoromethanesulfonate, tosylate and mesylate.

The term "sulfoxide" includes, for example, $(CH_3)_2S(=O)$ and $(C_6H_5)_2S=O$.

The term "thioether" includes, for example, $CH_3SCH_3$, $C_6H_5SCH_3$, $CH_3OCH_2CH_2SCH_3$ and tetrahydrothiophene.

For the purposes of the present application, the term "pyridine-based ligands" is used as a collective term for all pyridine-based ligands or derivatives thereof as mentioned, for example, in WO-A-03/011455. The term "pyridine-based ligands" hence includes pyridine itself, picolines (like α-, β- and γ-picoline), lutidines (like 2,3-, 2,4-, 2,5-, 2,6-, 3,4- and 3,5-lutidine), collidine (namely 2,4,6-trimethylpyridine), trifluoromethylpyridine, phenylpyridine, 4-(dimethylamino)-pyridine, chloropyridines, bromopyridines, nitropyridines, quinoline, pyrimidine, pyrrole, imidazole and phenylimidazole.

If $L^1$ represents a phosphine as electron-donating ligand in general formula (I) such phosphine preferably has the general formula (IIf) wherein

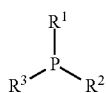

(IIf)

$R^1$, $R^2$ and $R^3$ are identical or different, even more preferably identical, and can represent $C_1$-$C_{20}$ alkyl, preferably methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl, n-hexyl, or neophenyl, $C_3$-$C_8$-cycloalkyl, preferably cyclopropyl, cyclobutyl, cyclopentyl, cyclohexyl, cycloheptyl or cyclooctyl, $C_1$-$C_{20}$ alkoxy, substituted or unsubstituted $C_6$-$C_{20}$ aryl, preferably phenyl, biphenyl, naphthyl, phenanthrenyl, anthracenyl, tolyl, 2,6-dimethylphenyl, or trifluoromethyl, $C_6$-$C_{20}$ aryloxy, $C_2$-$C_{20}$ heteroaryl with at least one heteroatom in the cycle, a $C_2$-$C_{20}$ heterocyclyl with at least one heteroatom in the cycle or halogen, preferably fluoro;

If $L^1$ represents a phosphine of general formula (IIf) as electron-donating ligand in general formula (I) such phosphine preferably represents $PPh_3$, $P(p\text{-}Tol)_3$, $P(o\text{-}Tol)_3$, $PPh(CH_3)_2$, $P(CF_3)_3$, $P(p\text{-}FC_6H_4)_3$, $P(p\text{-}CF_3C_6H_4)_3$, $P(C_6H_4\text{—}SO_3Na)_3$, $P(CH_2C_6H_4\text{—}SO_3Na)_3$, $P(isopropyl)_3$, $P(CHCH_3(CH_2CH_3))_3$, $P(cyclopentyl)_3$, $P(cyclohexyl)_3$, $P(neopentyl)_3$ or $P(neophenyl)_3$, wherein Ph means phenyl and Tol means tolyl.

The N-heterocyclic carbene ligand represents a cyclic carbene type ligand with at least one nitrogen as hetero atom being present in the ring. The ring can exhibit different substitution patterns on the ring atoms. Preferably this substitution pattern provides a certain degree of steric crowding.

In the context of this invention the N-heterocyclic carbene ligand(s) (hereinafter referred to as "NHC-ligand(s)") is/are preferably based on imidazoline or imidazolidine moieties.

The NHC-ligand typically has a structure corresponding to the general formulae (IIa) to (IIe)

(IIa)

(IIb)

(IIc)

(IId)

(IIe)

wherein
$R^8$, $R^9$, $R^{10}$ and $R^{11}$ are identical or different and represent hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_7$-$C_{25}$-alkaryl, $C_2$-$C_{20}$ heteroaryl, $C_2$-$C_{20}$ heterocyclyl, $C_1$-$C_{20}$-alkoxy, $C_2$-$C_{20}$-alkenyloxy, $C_2$-$C_{20}$-alkynyloxy, $C_6$-$C_{20}$-aryloxy, $C_2$-$C_{20}$-alkoxycarbonyl, $C_1$-$C_{20}$-alkylthio, $C_6$-$C_{20}$-arylthio, —Si(R)$_3$, —O—Si(R)$_3$, —O—C(=O)R, C(=O)R, —C(=O)N(R)$_2$, —NR—C(=O)—N(R)$_2$, —SO$_2$N(R)$_2$, —S(=O)R, —S(=O)$_2$R, —O—S(=O)$_2$R, halogen, nitro or cyano; wherein in all above occurrences relating to the meanings of $R^8$, $R^9$, $R^{10}$ and $R^{11}$ the group R is identical or different and represents hydrogen, alkyl, cycloalkyl, alkenyl, alkynyl, aryl or heteroaryl.

In these formulae (IIa) to (IIe) the carbon atom bonding to the Ruthenium metal center is formally a carbene carbon.

If appropriate, one or more of $R^8$, $R^9$, $R^{10}$, and $R^{11}$ can independently of one another, be substituted by one or more substituents, preferably straight-chain or branched $C_1$-$C_{10}$-alkyl, $C_3$-$C_8$-cycloalkyl, $C_1$-$C_{10}$-alkoxy, $C_6$-$C_{24}$-aryl, $C_2$-$C_{20}$ heteroaryl, $C_2$-$C_{20}$ heterocyclic, and a functional group selected from the group consisting of hydroxy, thiol, thioether, ketone, aldehyde, ester, ether, amine, imine, amide, nitro, carboxylic acid, disulphide, carbonate, isocyanate, carbodiimide, carboalkoxy, carbamate and halogen, wherein the abovementioned substituents, to the extent chemically possible, may in turn be substituted by one or more substituents, preferably selected from the group consisting of halogen, in particular chlorine or bromine, $C_1$-$C_5$-alkyl, $C_1$-$C_5$-alkoxy and phenyl.

Merely in the interest of clarity, it may be added that the structures of the NHC-ligand depicted in the general formulae (IIa) and (IIb) in the present patent application are equivalent to the structures (IIa-(i)) and (IIb-(i)) which are frequently also found in the literature for such NHC-ligands, respectively, and emphasize the carbene character of the NHC-ligand. This applies analogously to the further structures (IIc) to (IIe) as well as the associated preferred structures (IIIa)-(IIIu) depicted below.

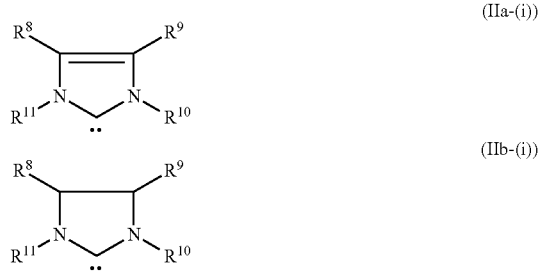

(IIa-(i))

(IIb-(i))

In preferred NHC-ligand(s) in the catalysts of the general formula (I)

$R^8$ and $R^9$ are identical or different and represent hydrogen, $C_6$-$C_{24}$-aryl, more preferably phenyl, straight-chain or branched $C_1$-$C_{10}$-alkyl, more preferably methyl, ethyl, n-propyl, i-propyl, n-butyl, sec-butyl, i-butyl or tert.-butyl or form a cycloalkyl or aryl structure together with the carbon atoms to which they are bound.

The preferred and more preferred meanings of $R^8$ and $R^9$ may be substituted by one or more further substituents selected from the group consisting of straight-chain or branched $C_1$-$C_{10}$-alkyl or $C_1$-$C_{10}$-alkoxy, $C_3$-$C_8$-cycloalkyl, $C_6$-$C_{24}$-aryl, and a functional group selected from the group consisting of hydroxy, thiol, thioether, ketone, aldehyde, ester, ether, amine, imine, amide, nitro, carboxylic acid, disulphide, carbonate, isocyanate, carbodiimide, carboalkoxy, carbamate and halogen, wherein all these substituents may in turn be substituted by one or more substituents, preferably selected from the group consisting of halogen, in particular chlorine or bromine, $C_1$-$C_5$-alkyl, $C_1$-$C_5$-alkoxy and phenyl.

In further preferred NHC-ligand(s) in the catalysts of the general formula (I)

$R^{10}$ and $R^{11}$ are identical or different and preferably represent straight-chain or branched $C_1$-$C_{10}$-alkyl, more preferably i-propyl or neopentyl, $C_3$-$C_{10}$-cycloalkyl, more preferably adamantyl, substituted or unsubstituted $C_6$-$C_{24}$-aryl, more preferably phenyl, 2,6-diisopropylphenyl, 2,6-dimethylphenyl, or 2,4,6-trimethylphenyl, $C_1$-$C_{10}$-alkylsulfonate, or $C_6$-$C_{10}$-arylsulfonate.

These preferred meanings of $R^{10}$ and $R^{11}$ may be substituted by one or more further substituents selected from the group consisting of straight-chain or branched $C_1$-$C_{10}$-alkyl or $C_1$-$C_{10}$-alkoxy, $C_3$-$C_8$-cycloalkyl, $C_6$-$C_{24}$-aryl, and a functional group selected from the group consisting of hydroxy, thiol, thioether, ketone, aldehyde, ester, ether, amine, imine, amide, nitro, carboxylic acid, disulphide, carbonate, isocyanate, carbodiimide, carboalkoxy, carbamate and halogen, wherein all these substituents may in turn be substituted by one or more substituents, preferably selected from the group consisting of halogen, in particular chlorine or bromine, $C_1$-$C_5$-alkyl, $C_1$-$C_5$-alkoxy and phenyl.

In preferred NHC-ligand(s) in the catalysts of the general formula (I)

$R^8$ and $R^9$ are identical or different and represent hydrogen, $C_6$-$C_{24}$-aryl, more preferably phenyl, straight-chain or branched $C_1$-$C_{10}$-alkyl, more preferably methyl, ethyl, n-propyl, i-propyl, n-butyl, sec-butyl, and i-butyl, or form a cycloalkyl or aryl structure together with the carbon atoms to which they are bound, and $R^{10}$ and $R^{11}$ are identical or different and preferably represent straight-chain or branched $C_1$-$C_{10}$-alkyl, more preferably i-propyl or neopentyl, $C_3$-$C_{10}$-cycloalkyl, more preferably adamantyl, substituted or unsubstituted $C_6$-$C_{24}$-aryl, more preferably phenyl, 2,6-diisopropylphenyl, 2,6-dimethylphenyl, or 2,4,6-trimethylphenyl, $C_1$-$C_{10}$-alkylsulfonate, or $C_6$-$C_{10}$-arylsulfonate.

Particularly preferred NHC-ligands have the following structures (IIIa) to (IIIu), where "Ph" means in each case phenyl, "Bu" means in each case butyl, i.e. either n-butyl, sec.-butyl, iso-butyl or tert.-butyl, "Mes" represents in each case 2,4,6-trimethylphenyl, "Dipp" means in all cases 2,6-diisopropylphenyl and "Dimp" means in each case 2,6-dimethylphenyl.

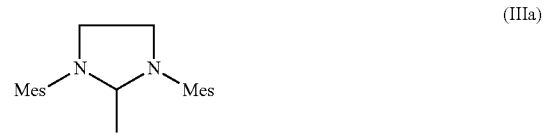

(IIIa)

(IIIb)

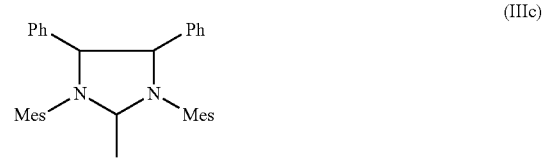

(IIIc)

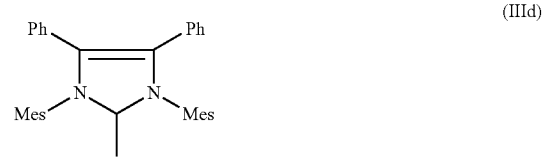

(IIId)

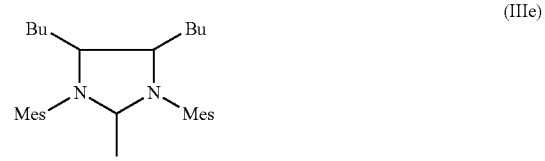

(IIIe)

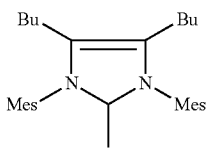 (IIIf)

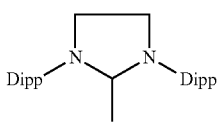 (IIIg)

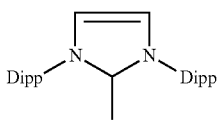 (IIIh)

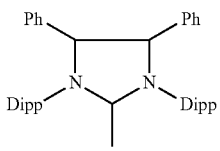 (IIIj)

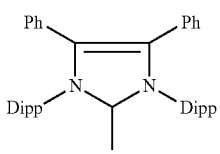 (IIIk)

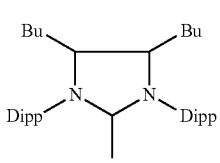 (IIIm)

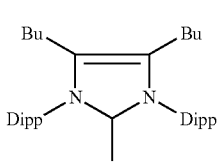 (IIIn)

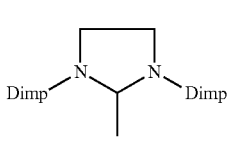 (IIIp)

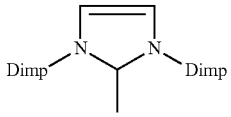 (IIIq)

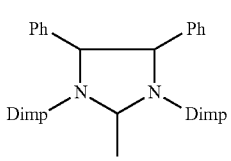 (IIIr)

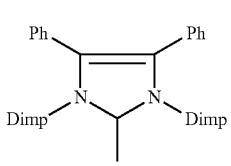 (IIIs)

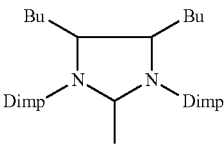 (IIIt)

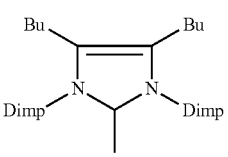 (IIIu)

Where the NHC-ligand contains not only an "N" (nitrogen), but also an "O" (oxygen) in the ring it is preferred that the substitution pattern of $R^8$, $R^9$, $R^{10}$ and/or $R^{11}$ provides a certain steric crowding.

Definition of $X^1$

In the catalysts of the general formula (I), $X^1$ preferably represents an anionic ligand.

In one embodiment of the catalysts of general formula (I), $X^1$ represents hydrogen, halogen, pseudohalogen, straight-chain or branched $C_1$-$C_{30}$-alkyl, $C_6$-$C_{24}$-aryl, $C_1$-$C_{20}$-alkoxy, $C_6$-$C_{24}$-aryloxy, $C_3$-$C_{20}$-alkyldiketonate, $C_6$-$C_{24}$-aryldiketonate, $C_1$-$C_{20}$-carboxylate, $C_1$-$C_{20}$-alkylsulfonate, $C_6$-$C_{24}$-arylsulfonate, $C_1$-$C_{20}$-alkylthiol, $C_6$-$C_{24}$-arylthiol, $C_1$-$C_{20}$-alkylsulfonyl or $C_1$-$C_{20}$-alkylsulfinyl.

The abovementioned moieties listed as meanings for $X^1$ can also be substituted by one or more further substituents, for example by halogen, preferably fluorine, $C_1$-$C_{10}$-alkyl, $C_1$-$C_{10}$-alkoxy or $C_6$-$C_{24}$-aryl, where these groups, too, may in turn also be substituted by one or more substituents selected from the group consisting of halogen, preferably fluorine, $C_1$-$C_5$-alkyl, $C_1$-$C_5$-alkoxy and phenyl.

In a preferred embodiment, $X^1$ is halogen, in particular fluorine, chlorine, bromine or iodine, benzoate, $C_1$-$C_5$-carboxylate, $C_1$-$C_5$-alkyl, phenoxy, $C_1$-$C_5$-alkoxy, $C_1$-$C_5$-alkylthiol, $C_6$-$C_{14}$-arylthiol, $C_6$-$C_{14}$-aryl or $C_1$-$C_5$-alkylsulfonate.

In a particularly preferred embodiment, $X^1$ represents chlorine, $CF_3COO$, $CH_3COO$, $CFH_2COO$, $(CH_3)_3CO$, $(CF_3)_2(CH_3)CO$, $(CF_3)(CH_3)_2CO$, phenoxy, methoxy, ethoxy, tosylate (p-$CH_3$—$C_6H_4$—$SO_3$), mesylate ($CH_3SO_3$) or trifluoromethanesulfonate ($CF_3SO_3$).

More preferred catalysts according to general formula (I) are the catalysts of formulae (I-a)-(I-d)

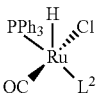 (I-a)

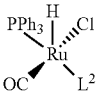 (I-b)

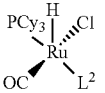 (I-c)

-continued (I-d)

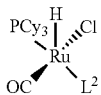

wherein $L^2$ represents an electron-donating ligand of the general formulae (IIa) or (IIb)

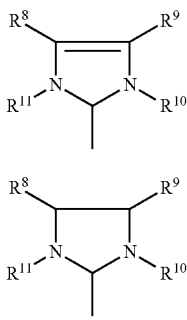

(IIa)

(IIb)

wherein
R[8] and R[9] are identical or different and represent hydrogen, $C_6$-$C_{24}$-aryl, more preferably phenyl, straight-chain or branched $C_1$-$C_{10}$-alkyl, more preferably methyl, ethyl, n-propyl, i-propyl, n-butyl, sec-butyl, and i-butyl, or form a cycloalkyl or aryl structure together with the carbon atoms to which they are bound, and
R[10] and R[11] are identical or different and preferably represent straight-chain or branched $C_1$-$C_{10}$-alkyl, more preferably i-propyl or neopentyl, $C_3$-$C_{10}$-cycloalkyl, more preferably adamantyl, substituted or unsubstituted $C_6$-$C_{24}$-aryl, more preferably phenyl, 2,6-diisopropylphenyl, 2,6-dimethylphenyl, or 2,4,6-trimethylphenyl, $C_1$-$C_{10}$-alkylsulfonate, or $C_6$-$C_{10}$-arylsulfonate or
wherein $L^2$ preferably represents an electron-donating ligand of the general formulae (IIIa) to (IIIu) as depicted above.

Even more preferred catalysts according to general formula (I) are the catalysts of formulae (I-a(1)), (I-b(1)), (I-c(1)) and (I-d(1))

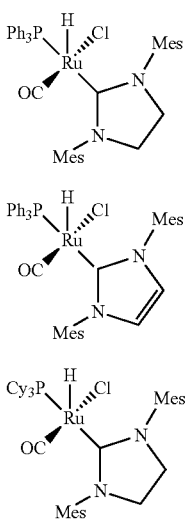

(I-a(1))

(I-b(1))

(I-c(1))

-continued (I-d(1))

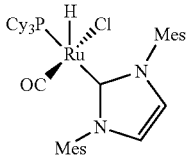

Catalysts on Support Materials:

In a further alternative embodiment all catalysts according to general formula (I) can be used in immobilized form. The immobilization favourably occurs via a chemical bond of the complex catalyst to the surface of a support material. Suited are e.g. complex catalysts having the general formulae (support-Ie) and (support-If) as depicted below, wherein $L^1$, $L^2$ and $X^1$ may have all general, preferred, more preferred, particularly preferred and most preferred meanings listed above in this application for general formula (I) and wherein "supp" stands for the support material. Preferably the support material represents a macromolecular material, or an inorganic material such as e.g. silica gel. As macromolecular material synthetic polymers or resins may be used, with polyethylene glycol, polystyrenes or cross-linked polystyrenes (e.g. poly(styrene-divinylbenzene) copolymers (PS-DVB)) being even more preferred. Such support material comprises functional groups on its surface which are able to form covalent bonds to one of the ligands $L^1$ or $L^2$.

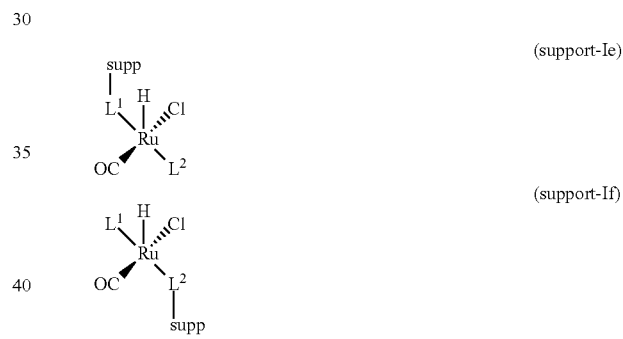

(support-Ie)

(support-If)

In the immobilized complex catalysts of general formulae (support-Ie) or (support-If) "supp" stands more preferably for a polymeric support, a resin, polyethyleneglycole, or silica gels having one or more functional groups "$X^2$" on their surface which are able to form a covalent bond to one of the ligands as shown in the above formulae.

Suitable functional groups "$X^2$" on the surface are hydroxyl, amino, thiol, carboxyl, $C_1$-$C_{20}$ alkoxy, $C_1$-$C_{20}$ alkylthio, —Si(R)$_3$, —O—Si(R)$_3$, $C_6$-$C_{14}$ aryloxy, $C_2$-$C_{14}$ heterocyclic, —C(=O)R, —C(=O)OR, —C(=O)N(R)$_2$, —SO$_2$N(R)$_2$, —S(=O)$_2$R, or —S(=O)R wherein in all above occurrences of R in $X^3$ is identical or different and shall mean H, $C_1$-$C_6$-alkyl, $C_5$-$C_6$-cycloalkyl, $C_2$-$C_6$-alkenyl, $C_2$-$C_6$-alkynyl, phenyl, imidazolyl, triazolyl, or pyridinyl moieties.

Polystyrene or cross-linked polystyrene is the preferred support material, even more preferably with hydroxyl groups on the surface to allow an easy coupling to the catalyst.

Synthesis of the Catalysts According to Formula (I):
Synthesis of NHC-Ligands:

For the synthesis of the NHC-ligands several procedures from the literature can be used which have been optimized already over time.

Hintermann (Beilstein Journal of Organic Chemistry 2007, 3, No. 22) gives synthetic procedures for 3 different immidazolium salts based on cheap basic chemicals. These salts can be easily converted into respective free carbenes by the action of strong bases. Especially the substitution pattern related to the groups attached to the immidazol-nitrogen atoms can be readily modified be employing the suitable amine. Considering the large array of aliphatic and even more aromatic amines available nowadays those skilled in the art of organic synthesis will appreciate the relative simplicity to obtain optimized catalyst compositions.

The synthesis of imidazoline-based NHC-carbenes also has been optimized recently by work of Kuhn and Grubbs (Org Lett. 2008 May 15; 10(10): 2075-2077). They propose a reaction sequence starting with the easy preparation of a large array of formamidines and the ring closure in a one-step reaction to yield imidazolinium salts. It is noteworthy that non-symmetrical NHC-ligands can also be prepared which enlarges the number of structural variation considerably.

Finally, Strassberger (Appl. Organometal. Chem. 2010, 24, 142-146) succeeded to synthesize substituted imidazolinium salts in multi-reactant one-pot routes using relatively cheap organic chemicals which are especially valuable for the possible substitution on the C-atoms at the 4 and 5 position, therefore the bulkiness of the NHC-ligands can further fine-tuned and through the introduction of various groups the electronical character of the NHC-ligand can be varied.

The processes referenced above may be rolled-out to a broad variety of NHC ligands.

Process for Preparing the Complex Catalysts of General Formula (I)

Catalyst complexes according to general formula (I) can be prepared by simple ligand exchange reactions using a carbene ligand such as described in Fogg et al (Organometallics 2005, 24, 1056-1058) with an example reaction path shown below.

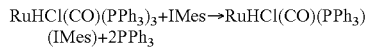
RuHCl(CO)(PPh$_3$)$_3$+IMes→RuHCl(CO)(PPh$_3$)(IMes)+2PPh$_3$

A similar procedure can also be found in Nolan et al (Organometallics 2001, 20, 794). This reaction is possible as the NHC-type carbene is a relatively electron rich carbene with stronger bonding capability compared to many phosphine ligands.

Another option is the synthesis of a complex such as RuHCl(CO)(NHC)(PPh$_3$) and a subsequent ligand exchange reaction with PCy$_3$ as described in Fogg et al. (Adv. Synth. Catal. 2008, 350, 773-777). This reaction allows to access various phosphine complexes provided the phosphine ligand to be introduced is stronger bonded to Ruthenium compared to PPh$_3$ for example.

Another synthetic approached includes the reaction of a Ruthenium complex which already carries a NHC-ligand with an akylidene ligand. Examples can be found in Mol et al., Eur. J. Inorg. Chem. 2003, 2827-2833 where a treatment with alcohol leads to the split-off of the benzylidene ligand and formation of a carbonyl-complex. However, this reaction path is only preferred if the introduction of a alkylidene ligand is fairly simple.

Most NHC-ligands are fairly stable and can therefore be isolated and introduced into the catalyst by the above mentioned ligand exchange reaction.

However, other typical precursors of the NHC-ligands are the respective salts such as imidazolium or imidazolinium salts for example. These salts can be deprotonated with strong bases generating the free carbenes as it is well known from the literature such as in Arduengo et al (J. Am. Chem. Soc., 1991, 113, 361-363) and following work from thereon. Although many carbenes of the NHC-type are surprisingly stable it may not always be practical to isolate them prior to the intended reaction with Ruthenium complexes. In that case the reaction mixture containing the carbene can directly be used in ligand exchange reactions if in prior trials a sufficiently high conversion of the NHC-salts to the carbene had been established.

Process for Hydrogenating Nitrile Rubbers:

The hydrogenation of the nitrile rubber can be carried out by bringing the nitrile rubber into contact with the novel complex catalyst of general formula (I) in the presence of hydrogen.

The hydrogenation is preferably carried out at a temperature in the range of from 60° C. to 200° C., preferably from 80° C. to 180° C., most preferably from 100° C. to 160° C. and at a hydrogen pressure in the range of 0.5 MPa to 35 MPa, more preferably of 3.0 MPa to 10 MPa.

Preferably, the hydrogenation time of the nitrile rubber is from 10 minutes to 24 hours, preferably from 15 minutes to 20 hours, more preferably from 30 minutes to 4 hours, even more preferably from 1 hour to 8 hours and most preferably from 1 hour to 3 hours.

The amount of the complex catalyst to the nitrile rubber depends on the nature and the catalytic activity of the catalyst. The amount of catalyst employed is typically chosen in the range of from 1 to 1000 ppm of noble metal, preferably from 2 to 500 ppm, in particular from 5 to 250 ppm, based on the nitrile rubber used.

Firstly, a solution of the nitrile rubber in a suitable solvent is prepared. The concentration of the nitrile rubber in the hydrogenation reaction is not critical, but it should naturally be ensured that the reaction is not adversely affected by an excessively high viscosity of the reaction mixture and any associated mixing problem. The concentration of NBR in the reaction mixture is preferably in the range from 1 to 25% by weight, particularly preferably in the range from 5 to 20% by weight, based on the total reaction mixture.

The hydrogenation reaction is typically carried out in a suitable solvent which does not deactivate the catalyst used and also does not adversely affect the reaction in any other way. Preferred solvents include but are not restricted to dichloromethane, benzene, toluene, methyl ethyl ketone, acetone, tetrahydrofuran, tetrahydropyran, dioxane and cyclohexane. The particularly preferred solvent is chlorobenzene.

Such solution of the nitrile rubber is then brought into contact with the catalyst according to general formula (I) in the presence of a hydrogen at the pressure mentioned above. The reaction mixture is typically stirred or any kind of shear is introduced to allow sufficient contact of the solution with the hydrogen phase.

One major advantage of the present invention resides in the fact that the complex catalyst used is very active, so that the catalyst residue in the final HNBR products can be low enough to make the catalyst metal removal or recycle step alleviated or even unnecessary. However, to the extent desired, the catalysts used during the process of the present invention may be removed. Such removal can be performed e.g. by using ion-exchange resins as described in EP-A-2 072 532 A1 and EP-A-2 072 533 A1. The reaction mixture obtained after the completion of the hydrogenation reaction can be taken and treated with an ion-exchange resin at e.g. 100° C. for 48 hours under nitrogen which leads to a bonding of the catalyst to the resin while the reaction mixture can be worked up with the usual finishing methods.

The rubber can then be obtained from the solution by known workup procedures such as steam coagulation, solvent evaporation or precipitation and dried to a degree that allows usage in typical rubber processing methods.

For the purposes of the present invention, hydrogenation is a reaction of the double bonds present in the starting nitrile rubber to an extent of at least 50%, preferably 70-100%, more preferably 80-100%, even more preferably 90-100% and most preferably 95-100%.

After the completion of the hydrogenation according to the present invention a hydrogenated nitrile rubber having a Mooney viscosity (ML1+4 at 100° C.), measured in accordance with ASTM standard D 1646, in the range from 1 to 130, preferably from 10 to 100, is obtained. This corresponds to a weight average molecular weight Mw in the range 2,000-400,000 g/mol, preferably in the range 20,000-200,000. The hydrogenated nitrile rubbers obtained also have a polydispersity PDI=Mw/Mn, where Mw is the weight average molecular weight and Mn is the number average molecular weight, in the range 1-5 and preferably in the range 2-4.

Nitrile Rubber:

The nitrile rubber used in the process of the present invention is a copolymer or terpolymer of at least one α,β-unsaturated nitrile, at least one conjugated diene and, if desired, one or more further copolymerizable monomers.

The conjugated diene can be of any nature. Preference is given to using ($C_4$-$C_6$) conjugated dienes, more preferably selected from the group consisting of 1,3-butadiene, isoprene, 2,3-dimethylbutadiene, piperylene and mixtures thereof. Very particular preference is given to 1,3-butadiene and isoprene or mixtures thereof. Especial preference is given to 1,3-butadiene.

As α,β-unsaturated nitrile, it is possible to use any known α,β-unsaturated nitrile, preferably a ($C_3$-$C_5$) α,β-unsaturated nitrile, more preferably selected from the group consisting of acrylonitrile, methacrylonitrile, ethacrylonitrile and mixtures thereof. Particular preference is given to acrylonitrile.

A particularly preferred nitrile rubber used in the process of this invention is thus a copolymer having repeating units derived from acrylonitrile and 1,3-butadiene.

Apart from the conjugated diene and the α,β-unsaturated nitrile, the hydrogenated nitrile rubber may comprise repeating units of one or more further copolymerizable monomers known in the art, e.g. α,β-unsaturated (preferably monounsaturated) monocarboxylic acids, their esters and amides, α,β-unsaturated (preferably mono-unsaturated) dicarboxylic acids, their mono-oder diesters, as well as the respective anhydrides or amides of said α,β-unsaturated dicarboxylic acids.

As α,β-unsaturated monocarboxylic acids acrylic acid and methacrylic acid are preferably used.

Esters of α,β-unsaturated monocarboxylic acids may also be used, in particular alkyl esters, alkoxyalkyl esters, aryl esters, cycloalkylesters, cyanoalkyl esters, hydroxyalkyl esters, and fluoroalkyl esters.

As alkyl esters $C_1$-$C_{18}$ alkyl esters of the α,β-unsaturated monocarboxylic acids are preferably used, more preferably $C_1$-$C_{18}$ alkyl esters of acrylic acid or methacrylic acid, such as methylacrylate, ethylacrylate, propylacrylate, n-butylacrylate, tert.-butylacrylate, 2-ethyl-hexylacrylate, n-dodecylacrylate, methylmethacrylate, ethylmethacrylate, propylmethacrylate, n-butylmethacrylate, tert.-butylmethacrylate and 2-ethylhexyl-methacrylate.

As alkoxyalkyl esters $C_2$-$C_{18}$ alkoxyalkyl esters of α,β-unsaturated monocarboxylic acids are preferably used, more preferably alkoxyalkylester of acrylic acid or methacrylic acid such as methoxy methyl(meth)acrylate, methoxy ethyl (meth)acrylate, ethoxyethyl(meth)acrylate and methoxyethyl(meth)acrylate.

It is also possible to use aryl esters, preferably $C_6$-$C_{14}$-aryl-, more preferably $C_6$-$C_{10}$-aryl esters and most preferably the aforementioned aryl esters of acrylates and methacrylates.

In another embodiment cycloalkyl esters, preferably $C_5$-$C_{12}$-, more preferably $C_6$-$C_{12}$-cycloalkyl and most preferably the aforementioned cycloalkyl acrylates and methacrylates are used.

It is also possible to use cyanoalkyl esters, in particular cyanoalkyl acrylates or cyanoalkyl methacrylates, with 2 to 12 C atoms in the cyanoalkyl group, preferably α-cyanoethyl acrylate, β-cyanoethyl acrylate or cyanobutyl methacrylate.

In another embodiment hydroxyalkyl esters are used, in particular hydroxyalkyl acrylates and hydroxyalkyl methacrylates with 1 to 12 C-atoms in the hydroxylalkyl group, preferably 2-hydroxyethyl acrylate, 2-hydroxyethyl methacrylate or 3-hydroxypropyl acrylate.

It is also possible to use fluorobenzyl esters, in particular fluorobenzyl acrylates or fluorobenzyl methacrylates, preferably trifluoroethyl acrylate and tetrafluoropropyl methacrylate. Substituted amino group containing acrylates and methacrylates may also be used like dimethylaminomethyl acrylate and diethylaminoethylacrylate.

Various other esters of the α,β-unsaturated carboxylic acids may also be used, like e.g. poly-ethyleneglycol(meth) acrylate, polypropyleneglycole(meth)acrylate, glycidyl (meth)acrylate, epoxy(meth)acrylate, N-(2-hydroxyethyl) acrylamide, N-(2-hydroxymethyl)acrylamide or urethane (meth)acrylate.

It is also possible to use mixture of all aforementioned esters of α,β-unsaturated carboxylic acids.

Furtheron α,β-unsaturated dicarboxylic acids may be used, preferably maleic acid, fumaric acid, crotonic acid, itaconic acid, citraconic acid and mesaconic acid.

In another embodiment anhydrides of α,β-unsaturated dicarboxylic acids are used, preferably maleic anhydride, itaconic anhydride, itaconic anhydride, citraconic anhydride and mesaconic anhydride.

In a further embodiment mono- or diesters of α,β-unsaturated dicarboxylic acids can be used. Suitable alkyl esters are e.g. $C_1$-$C_{10}$-alkyl, preferably ethyl-, n-propyl-, iso-propyl, n-butyl-, tert.-butyl, n-pentyl-oder n-hexyl mono- or diesters. Suitable alkoxyalkyl esters are e.g. $C_2$-$C_{12}$ alkoxyalkyl-, preferably $C_3$-$C_8$-alkoxyalkyl mono- or diesters. Suitable hydroxyalkyl esters are e.g. $C_1$-$C_{12}$ hydroxyalkyl-, preferably $C_2$-$C_8$-hydroxyalkyl mono- or diesters. Suitable cycloalkyl esters are e.g. $C_5$-$C_{12}$-cycloalkyl-, preferably $C_6$-$C_{12}$-cycloalkyl mono- or diesters. Suitable alkylcycloalkyl esters are e.g. $C_6$-$C_{12}$-alkylcycloalkyl-, preferably $C_7$-$C_{10}$-alkylcycloalkyl mono- or diesters. Suitable aryl esters are e.g. $C_6$-$C_{14}$-aryl, preferably $C_6$-$C_{10}$-aryl mono- or diesters.

Explicit examples of the α,β-ethylenically unsaturated dicarboxylic acid monoester monomers include
  maleic acid monoalkyl esters, preferably monomethyl maleate, monoethyl maleate, monopropyl maleate, and mono n-butyl maleate;
  maleic acid monocycloalkyl esters, preferably monocyclopentyl maleate, monocyclohexyl maleate, and monocycloheptyl maleate;
  maleic acid monoalkylcycloalkyl esters, preferably monomethylcyclopentyl maleate, and monoethylcyclohexyl maleate;
  maleic acid monoaryl ester, preferably monophenyl maleate;

maleic acid mono benzyl ester, preferably monobenzyl maleate;
fumaric acid monoalkyl esters, preferably monomethyl fumarate, monoethyl fumarate, monopropyl fumarate, and mono n-butyl fumarate;
fumaric acid monocycloalkyl esters, preferably monocyclopentyl fumarate, monocyclohexyl fumarate, and monocycloheptyl fumarate;
fumaric acid monoalkylcycloalkyl esters, preferably monomethylcyclopentyl fumarate, and monoethylcyclohexyl fumarate;
fumaric acid monoaryl ester, preferably monophenyl fumarate;
fumaric acid mono benzyl ester, preferably monobenzyl fumarate;
citraconic acid monoalkyl esters, preferably monomethyl citraconate, monoethyl citraconate, monopropyl citraconate, and mono n-butyl citraconate;
citraconic acid monocycloalkyl esters, preferably monocyclopentyl citraconate, monocyclohexyl citraconate, and monocycloheptyl citraconate;
citraconic acid monoalkylcycloalkyl esters, preferably monomethylcyclopentyl citraconate, and monoethylcyclohexyl citraconate;
citraconic acid mono aryl ester, preferably monophenyl citraconate;
citraconic acid mono benzyl ester, preferably monobenzyl citraconate;
itaconic acid mono alkyl esters, preferably monomethyl itaconate, monoethyl itaconate, monopropyl itaconate, and mono n-butyl itaconate;
itaconic acid monocycloalkyl esters, preferably monocyclopentyl itaconate, monocyclohexyl itaconate, and monocycloheptyl itaconate;
itaconic acid monoalkylcycloalkyl esters, preferably monomethylcyclopentyl itaconate, and monoethylcyclohexyl itaconate;
itaconic acid mono aryl ester, preferably monophenyl itaconate;
itaconic acid mono benzyl ester, preferably monobenzyl itaconate.

As α,β-ethylenically unsaturated dicarboxylic acid diester monomers the analogous diesters based on the above explicitly mentioned mono ester monomers may be used, wherein, however, the two organic groups linked to the C=O group via the oxygen atom may be identical or different.

As further termonomers vinyl aromatic monomers like styrol, α-methylstyrol and vinylpyridine, as well as non-conjugated dienes like 4-cyanocyclohexene and 4-vinylcyclohexene, as well as alkines like 1- or 2-butine may be used.

Particularly preferred are termonomers chosen from the below depicted formulae:

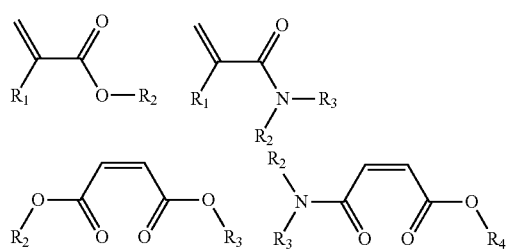

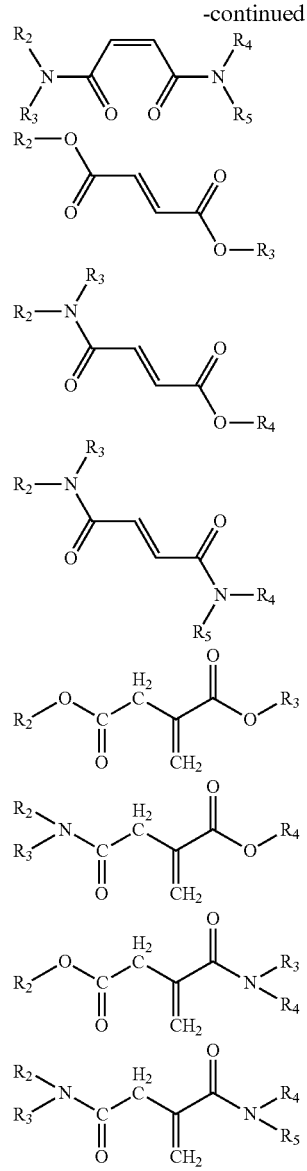

wherein
$R^1$ is hydrogen or a methyl group, and
$R^2$, $R^3$, $R^4$, $R^5$ are identical or different and may represent H, $C_1$-$C_{12}$ alkyl, $C_3$-$C_8$ cycloalkyl, alkoxyalkyl, hydroxyalkyl, expoxyalkyl, aryl, or heteroaryl.

The proportions of conjugated diene and α,β-unsaturated nitrile in the NBR polymers to be used can vary within wide ranges. The proportion of the conjugated diene or the sum of conjugated dienes is usually in the range from 40 to 90% by weight, preferably in the range from 60 to 85% by weight, based on the total polymer. The proportion of α,β-unsaturated nitrile or the sum of α,β-unsaturated nitriles is usually from 10 to 60% by weight, preferably from 15 to 40% by weight, based on the total polymer. The proportions of the monomers in each case add up to 100% by weight. The additional monomers can be present in amounts of from 0 to 40% by weight, preferably from 0.1 to 40% by weight, particularly preferably from 1 to 30% by weight, based on the total polymer. In this case, corresponding proportions of the conjugated diene or dienes and/or the α,β-unsaturated nitrile or nitriles are replaced by proportions of the additional monomers, with the proportions of all monomers in each case adding up to 100% by weight.

The preparation of the nitrile rubbers by polymerization of the abovementioned monomers is adequately and comprehensively known from prior art. Nitrile rubbers which can be used for the purposes of the invention are also commercially available, e.g. as products from the product range of the Perbunan® and Krynac® grades of Lanxess Deutschland GmbH.

The invention is further illustrated but is not intended to be limited by the following examples in which all parts and percentages are by weight unless otherwise specified.

EXAMPLES

Abbreviations phr per hundred rubber (weight)
rpm revolution per minute
Mn number-average molecular weight
Mw weight-average molecular weight
PDI polydispersity index, defined as Mw/Mn
PPh$_3$ triphenylphosphine
MCB monochlorobenzene
Rt. room temperature (22+/−2° C.)
RDB residue double bonds, in %, RDB=(1-hydrogenation degree)*100 with NBR having an RDB of 100%
NHC N-heterocyclic-carbene
Cy cyclohexyl-ring
Et$_3$N triethylamine
IMes N,N'-bis(mesityl)imidazol-2-ylidene
SIMes N,N'-bis(mesityl)imidazolidin-2-ylidene, also can be called H2-Imes
IPr N,N'-bis(2,6-diisopropylphenyl)imidazol-2-ylidene
ItBu N,N'-bis(tert-butyl)imidazol-2-ylidene A Preparation of Catalysts A1 NHC-Ligands N,N'-bis(mesityl)imidazol-2-ylidene (IMes) was purchased from TCI.
N,N'-bis(mesityl)imidazolidin-2-ylidene (SIMes) was purchased from Strem.
N,N'-bis(2,6-diisoisopropylphenyl)imidazol-2-ylidene (IPr) was purchased from TCI.
N,N'-bis(tert-butyl)imidazol-2-ylidene (ItBu) was purchased from Strem.

The following complex catalysts (a)-(i) were used, catalysts (b) to (i) were prepared similar to procedures found in the literature as outlined below:

(a) RhCl(PPh$_3$)$_3$ (Used in Comparative Examples)
obtained from Sigma-Aldrich and used without further purification.

(b) RuHCl(CO)(PCy$_3$)$_2$ (Used in Comparative Examples)
The complex was prepared following a procedure by James et al, Adv. in Chem. Ser., 196 (1983) as follows: RuCl$_3$.xH$_2$O (0.635 g, 2.5 mmol) was dissolved in methoxyethanol (15 ml).

After 5 min PCy$_3$(2.056 g, 7.5 mmol) was added. The mixture was heated under reflux for 20 min. Then Et$_3$N(2 ml) was added. The mixture was heated under reflux for another 6 h and then cooled. The microcrystal orange product was filtered and then washed with toluene (2 times, each 10 ml) and dried in vacuum. The yield obtained was ca.1.45 g (80%) as yellow crystals. The FT-IR on a saturated solution in MCB gave a single peak (CO) at 1901 cm$^{-1}$ and was thus considered to be free from the possible by-product RuHCl(CO)$_2$(PCy$_3$)$_2$.

(c) RuHCl(CO)(IMes)(PCy$_3$) (Used in Inventive Examples)
The complex was prepared by reacting RuHCl(CO)(PCy$_3$)$_2$ with IMes following the procedure in Nolan et al (Organometallics 2001, 20, 794) as follows: A 100 mL flask was charged with RuHCl(CO)(PCy$_3$)$_2$ (510 mg, 0.7 mmol) and IMes(302 mg, 1.05 mmol), degassed. Then 20 mL toluene was added via a syringe. Then the solution was heated at 80° C. for 2 h and stirred for 18 h at rt. The solution was removed under vacuum. The orange-yellow residue was taken up in 20 mL ethanol (degassed and dried). Then the suspension was filtered. The precipitate was washed with ethanol (20 mL*3) and dried under vacuum. The yield obtained was ca.125.7 mg as orange crystals with a single peak (CO) at 1897 cm$^{-1}$ (lit. 1896 cm$^{-1}$ in CH$_2$Cl$_2$).

(d) RuHCl(CO)(SIMes)(PCy$_3$) (Used in Inventive Examples)
This complex was prepared by reacting RuHCl(CO)(PCy$_3$)$_2$ with SIMes adapting the procedure in Nolan et al (Organometallics 2001, 20, 794) by replacing IMes by the same molar amount of SIMes. The complex was obtained as yellowish crystal with a single peak (CO) at 1897 cm$^{-1}$ (lit. 1896 cm$^{-1}$ in toluene).

(e) RuHCl(CO)(IMes)(PPh$_3$) (Used in Inventive Examples)
This complex was prepared by reacting RuHCl(CO)(PPh$_3$)$_3$ (purchased from Alfar Aesar) with IMes following the procedure in Fogg et al (Organometallics 2005, 24, 1056-1058) as follows: A solution of IMes(188 mg, 0.62 mmol) in 8 ml toluene was added to a suspension of RuHCl(CO)(PPh$_3$)$_3$(420 mg, 0.44 mmol) in 8 ml toluene. The solution was stirred at 22° C. for 3 h. Then the solution was concentrated under vacuum to ca. 0.5 ml, treated with 20 ml hexane, and chilled to −35° C. using a cold ethanol bath. A yellow-orange microcrystalline precipitate was obtained, which was filtered off, washed with cold hexane (3 times, each 5 ml) and dried under vacuum. The yield obtained was ca.0.25 g (77%) in the form of orange crystals with a single FTIR-peak (CO) at 1913 cm$^{-1}$. (lit 1913 cm$^{-1}$ in Nujol, Fogg et al., Organometallics 2005, 24, 1056-1058).

(f) RuHCl(CO)(SIMes)(PPh$_3$) (Used in Inventive Examples)
The same procedure as described under (e) was used with the same molar amount of SIMes and ca 0.28 g (85%) yellow crystals were obtained, showing a single FTIR-peak (CO) at 1911 cm$^{-1}$ (lit 1911 cm$^{-1}$ in Nujol, Fogg et al., Organometallics 2005, 24, 1056-1058)

(g) RuHCl(CO)(IPr)(PPh$_3$) (Used in Inventive Examples)
The same procedure as described under (e) was used with the same molar amount of IPr and ca 0.25 g (83%) yellow crystals were obtained.

(h) RuHCl(CO)(IPr)(PCy$_3$) (Used in Inventive Examples)
This complex was prepared by reacting RuHCl(CO)(PCy$_3$)$_2$ with IPr adapting the procedure in Nolan et al (Organometallics 2001, 20, 794) by replacing IMes by the same molar amount of IPr. The complex was obtained as yellowish crystal with a single peak (CO) at 1901 cm$^{-1}$.

(i) RuHCl(CO)(ItBu)(PCy$_3$) (Used in Inventive Examples)
This complex was prepared by reacting RuHCl(CO)(PCy$_3$)$_2$ with IPr adapting the procedure in Nolan et al (Organometallics 2001, 20, 794) by replacing ItBu by the same molar amount of ItBu. The complex was obtained as yellowish crystal with a single peak (CO) at 1902 cm$^{-1}$.

B Nitrile Butadiene Rubbers

The nitrile butadiene rubbers which were used in the examples are commercially available from Lanxess Deutschland GmbH and have the properties as outlined in Table 1.

TABLE 1

Nitrile Butadiene Rubbers (NBR) used

| NBR | Acrylontrile content, % by weight | Mooney viscosity ML(1 + 4)@100° C. | Mn | Mw | PDI |
|---|---|---|---|---|---|
| Perbunan ® 3431 VP | 35 | 32.4 | 73428 | 253597 | 3.45 |
| Perbunan ® 3431 F | 35 | 28.8 | 76612 | 257771 | 3.36 |
| Krynac ® 4450 F | 44 | 42.0 | 81506 | 232840 | 2.86 |
| Krynac ® X 740* | 27 | 36.0 | 81020 | 236370 | 2.92 |

*Krynac X 740, X grade, carboxylic acid content 7 wt %

C Hydrogenation of Nitrile Rubber

Catalysts (a) to (i) were used in amounts in the range of from 0.02 to 0.05 phr as shown in the subsequent Tables under Section E.

The conditions for hydrogenation were:
8.3 MPa (1200 psi) hydrogen pressure
800 rpm of agitation
Temperature: variable, ranging from 120 to 155° C. as shown in the subsequent tables.
Time: variable depending on the progress of hydrogenation as shown in the subsequent tables.

Hydrogenation Procedure:
(1) The nitrile rubber was dissolved in a certain amount of MCB to form NBR solution (6 wt % concentration or 12.7 wt %). The solution was filled in autoclave (600 mL volume or 2 L volume) and bubbled with nitrogen gas for 20 minutes to remove dissolved oxygen.
(2) Under nitrogen protection, catalyst was dissolved in a sufficient amount of degassed MCB (15 or 38 ml). Under nitrogen protection the solution was transferred into a stainless bomb connected with a valve to the autoclave via syringe.
(3) After the autoclave was heated to desired temperature, the catalyst solution was shot into the autoclave by applying hydrogen pressure. Then the hydrogen pressure was raised to desired value.
(4) Samples were taken out at intervals for FT-IR test to monitor the RDB.
(5) After the finish of NBR hydrogenation, the solution was cooled down and the pressure was released. When catalyst (a) was used, the HNBR solution was treated with thiourea resin to removal Rh metal before stripping. When catalysts (b) to (g) were used, no resin treatment was applied. Finally the HNBR crumbs were isolated by stripping and dried in vacuo.

D Analysis and Tests

Measurement of molecular weights $M_n$ and $M_w$ by GPC:

The molecular weights $M_n$ and $M_w$ were determined by a Waters GPC system equipped with a Waters 1515 high performance liquid chromatography pump, a Waters 717plus autosampler, a PL gel 10 μm mixed B column and a Waters 2414 RI detector. The GPC test was carried out at 40° C. at 1 mL/min of flow rate with THF as the eluent, and the GPC column was calibrated with narrow PS standard samples.

Measurement of the Hydrogenation Degree by FT-IR:

The spectrum of nitrile rubber before, during and after the hydrogenation reaction was recorded on a Perkin Elmer spectrum 100 FT-IR spectrometer. The solution of the (hydrogenated) nitrile butadiene rubber in MCB was cast onto a KBr disk and dried to form a film for the test. The hydrogenation degree was determined by the FT-IR analysis according to the ASTM D 5670-95 method.

Measurement of the Gel Content:

A certain and constant weight of the HNBR sample was dissolved in 20 mL of methylethylketone. The solution was centrifuged for 1 hour at 20,000 rpm. The liquid was decanted and the obtained gel was dried and weight to give the gel content value.

Measurement of the Benzene Content in HNBR Solution after Hydrogenation by GC-MS:

When MCB is employed as the solvent for NBR hydrogenation, it may be catalytically transformed into benzene and HCl. The latter disadvantageously leads to metal corrosion during hydrogenation process. The presence of benzene is also not desired. The measurement of the benzene concentration after the hydrogenation also allows to draw a conclusion about the formation of HCl which is otherwise inconvenient and difficult to measure. The concentration of benzene in the solution obtained after hydrogenation was determined by GC-MS.

E Results

TABLE E.1

Comparative Examples in 600 mL reactor, 5.7 wt % NBR concentration (catalyst (a) and (b))

| | NBR solution | | Catalyst solution | | | Hydrogenation | |
|---|---|---|---|---|---|---|---|
| No. | NBR | MCB | Catalyst | MCB | Temp. | Time | degree |
| CEx. 1 | Perbunan ® 3431VP, 18 g | 282 g | cat. (a), 6.7 mg, 0.037 phr, plus PPh₃, 0.18 g, 1.0 phr. 41 ppm Rh | 17 g | 138° C. | 1 h | 74.5% |
| | | | | | | 2 h | 89.8% |
| | | | | | | 3 h | 94.3% |
| | | | | | | 4 h | 95.9% |

TABLE E.1-continued

Comparative Examples in 600 mL reactor, 5.7 wt % NBR concentration (catalyst (a) and (b))

| CEx. 2 | Perbunan ® 3431VP, 18 g | 282 g | cat. (b), 5.0 mg, 0.028 phr, 39 ppm Ru | 17 g | 138° C. | 0.5 h<br>1 h<br>2 h<br>3 h<br>4 h<br>5 h | 30.0%<br>32.5%<br>42.5%<br>55.3%<br>54.8%<br>60.4% |
|---|---|---|---|---|---|---|---|

| No. | time | Mn | Mw | PDI |
|---|---|---|---|---|
| CEx. 1 | 4 h | 87884 | 278827 | 3.17 |
| CEx. 2 | 5 h | 78708 | 267818 | 3.40 |

TABLE E.2

Comparative Example in 2 L reactor, 5.7% NBR concentration (catalyst b)

| | NBR solution | | Catalyst solution | | | | Hydrogenation |
|---|---|---|---|---|---|---|---|
| No. | NBR | MCB | Catalyst | MCB | Temp. | Time | degree |
| CEx. 3 | Perbunan ® 3431VP, 45 g | 705 g | cat. (b), 22.5 mg, 0.05 phr, 70 ppm, | 42 g | 138° C. | 0.5 h<br>1 h<br>2 h<br>3 h<br>4 h<br>5 h | 40.3%<br>59.3%<br>81.2%<br>90.2%<br>95.3%<br>97.5% |

| No. | time | Mn | Mw | PDI |
|---|---|---|---|---|
| CEx. 3 | 5 h | 80151 | 240719 | 3.00 |

TABLE E.3

Comparative Examples in 2 L reactor, 12% NBR concentration (catalyst a)

| | NBR solution | | Catalyst solution | | | | Hydrogenation |
|---|---|---|---|---|---|---|---|
| No. | NBR | MCB | Catalyst | MCB | Temp. | Time | degree |
| CEx. 4 | Perbunan ® 3431VP, 90 g | 619 g | cat. (a), 33.3 mg, 0.037 phr, plus PPh₃, 0.9 g, 1.0 phr, 41 ppm Rh | 42 g | 138° C. | 0.5 h<br>1 h<br>2 h<br>3 h<br>4 h<br>5 h | 52.3%<br>67.7%<br>80.1%<br>82.2%<br>84.6%<br>85.6% |
| CEx. 5 | Perbunan ® 3431VP, 90 g | 619 g | cat. (a), 54 mg, 0.06 phr, plus PPh₃, 0.9 g, 1.0 phr, 67 ppm Rh | 42 g | 138° C. | 0.5 h<br>1 h<br>2 h<br>3 h<br>4 h<br>5 h<br>6 h | 53.5%<br>75.3%<br>89.0%<br>93.9%<br>95.4%<br>96.4%<br>96.9% |

| No | time | Mn | M | PDI |
|---|---|---|---|---|
| CEx. 4 | 5 h | 88322 | 258143 | 2.92 |
| CEx. 5 | 6 h | 91837 | 260059 | 2.83 |

TABLE E.4

Inventive Examples with catalyst (c) (RuHCl(CO)(IMes)(PCy$_3$)) in 600 mL reactor, 5.7% NBR concentration

| | NBR solution | | Catalyst solution | | | | Hydrogenation |
|---|---|---|---|---|---|---|---|
| No. | NBR | MCB | Catalyst | MCB | Temp. | Time | degree |
| Ex.1 | Perbunan ® 3431VP, 18 g | 282 g | 5.4 mg, 0.03 phr, | 17 g | 120° C. | 0.5 h<br>1 h | 43.4%<br>68.0% |

TABLE E.4-continued

Inventive Exampleswith catalyst (c) (RuHCl(CO)(IMes)(PCy$_3$)) in 600 mL reactor, 5.7% NBR concentration

|  |  |  |  |  |  | 2 h | 84.2% |
|---|---|---|---|---|---|---|---|
|  |  |  | 41 ppm |  |  | 3 h | 91.7% |
|  |  |  | Ru |  |  | 4 h | 95.2% |
|  |  |  |  |  |  | 5 h | 96.9% |
| Ex.2 | Perbunan ® 3431VP, 18 g | 282 g | 5.4 mg, 0.03 phr, 41 ppm Ru | 17 g | 130° C. | 0.5 h | 52.0% |
|  |  |  |  |  |  | 1 h | 74.0% |
|  |  |  |  |  |  | 2 h | 90.5% |
|  |  |  |  |  |  | 3 h | 96.2% |
|  |  |  |  |  |  | 4 h | 98.3% |
|  |  |  |  |  |  | 5 h | 99.0% |
| Ex.3 | Perbunan ® 3431VP, 18 g | 282 g | 5.4 mg, 0.03 phr, 41 ppm Ru | 17 g | 138° C. | 0.5 h | 54.8% |
|  |  |  |  |  |  | 1 h | 77.3% |
|  |  |  |  |  |  | 2 h | 92.6% |
|  |  |  |  |  |  | 3 h | 96.5% |
|  |  |  |  |  |  | 4 h | 98.4% |
|  |  |  |  |  |  | 5 h | 99.0% |
| Ex.4 | Perbunan ® 3431VP, 18 g | 282 g | 5.4 mg, 0.03 phr, 41 ppm Ru | 17 g | 145° C. | 0.5 h | 69.6% |
|  |  |  |  |  |  | 1 h | 84.6% |
|  |  |  |  |  |  | 2 h | 92.7% |
|  |  |  |  |  |  | 3 h | 98.1% |
|  |  |  |  |  |  | 4 h | 99.1% |
|  |  |  |  |  |  | 5 h | 99.5% |
| Ex.5 | Perbunan ® 3431VP, 18 g | 282 g | 5.4 mg, 0.03 phr, 41 ppm Ru | 17 g | 150° C. | 0.5 h | 67.7% |
|  |  |  |  |  |  | 1 h | 86.9% |
|  |  |  |  |  |  | 2 h | 95.4% |
|  |  |  |  |  |  | 3 h | 98.8% |
|  |  |  |  |  |  | 4 h | 99.3% |
|  |  |  |  |  |  | 5 h | 99.5% |
| Ex. 6 | Perbunan ® 3431VP, 18 g | 282 g | 5.4 mg, 0.03 phr, 41 ppm Ru | 17 g | 155° C. | 0.5 h | 63.5% |
|  |  |  |  |  |  | 1 h | 78.0% |
|  |  |  |  |  |  | 2 h | 88.0% |
|  |  |  |  |  |  | 3 h | 94.2% |
|  |  |  |  |  |  | 4 h | 96.5% |
|  |  |  |  |  |  | 5 h | 97.4% |
| Ex. 7 | Perbunan ® 3431F, 18 g | 282 g | 5.4 mg, 0.03 phr, 41 ppm Ru | 17 g | 145° C. | 0.5 h | 56.1% |
|  |  |  |  |  |  | 1 h | 76.3% |
|  |  |  |  |  |  | 2 h | 88.9% |
|  |  |  |  |  |  | 3 h | 94.8% |
|  |  |  |  |  |  | 4 h | 96.9% |
|  |  |  |  |  |  | 5 h | 98.8% |

| No. | time | Mn | Mw | PDI |
|---|---|---|---|---|
| Ex.1 | 5 h | 85231 | 289396 | 3.40 |
| Ex.2 | 5 h | 84937 | 299443 | 3.53 |
| Ex.3 | 5 h | 88538 | 296844 | 3.35 |
| Ex.4 | 5 h | 84970 | 290266 | 3.42 |
| Ex.5 | 5 h | 93106 | 291193 | 3.13 |
| Ex.6 | 5 h | 92952 | 292270 | 3.14 |
| Ex.7 | 5 h | 88777 | 285743 | 3.22 |

TABLE E.5

Inventive Examples with catalyst (c) (RuHCl(CO)(IMes)(PCy$_3$)) in 2 L reactor, 5.7% NBR concentration

| No. | NBR solution | | Catalyst solution | | Temp | Time | Hydrogenation degree |
|---|---|---|---|---|---|---|---|
|  | NBR | MCB | Catalyst (c) | MCB |  |  |  |
| Ex.8 | Perbunan ® 3431VP, 45 g | 705 g | 13.5 mg, 0.03 phr, 41 ppm Ru | 42 g | 138° C. | 0.5 h | 49.1% |
|  |  |  |  |  |  | 1 h | 68.8% |
|  |  |  |  |  |  | 2 h | 87.0% |
|  |  |  |  |  |  | 3 h | 94.6% |
|  |  |  |  |  |  | 4 h | 97.7% |
|  |  |  |  |  |  | 5 h | 98.6% |
| Ex.9 | Perbunan ® 3431VP, 45 g | 705 g | 23.3 mg, 0.052 phr, 70 ppm Ru | 42 g | 138° C. | 0.5 h | 73.0% |
|  |  |  |  |  |  | 1 h | 95.3% |
|  |  |  |  |  |  | 1.5 h | 99.2% |
|  |  |  |  |  |  | 1.75 h | 99.8% |
| Ex.10 | Perbunan ® 3431VP, 45 g | 705 g | 9 mg, 0.02 phr, 27 ppm Ru | 42 g | 138° C. | 1 h | 47.4% |
|  |  |  |  |  |  | 2 h | 68.0% |
|  |  |  |  |  |  | 3 h | 81.6% |

TABLE E.5-continued

Inventive Examples with catalyst (c) (RuHCl(CO)(IMes)(PCy$_3$)) in 2 L reactor, 5.7% NBR concentration

|        |                    |       |                     |      |         | 4 h    | 88.2% |
|--------|--------------------|-------|---------------------|------|---------|--------|-------|
|        |                    |       |                     |      |         | 5 h    | 92.6% |
|        |                    |       |                     |      |         | 6 h    | 94.8% |
|        |                    |       |                     |      |         | 9.5 h  | 98.1% |
|        |                    |       |                     |      |         | 21 h   | 99.7% |
| Ex.11  | Perbunan ® 3431VP, | 705 g | 6.8 mg,             | 42 g | 138° C. | 1 h    | 30.4% |
|        | 45 g               |       | 0.015 phr,          |      |         | 2 h    | 38.9% |
|        |                    |       | 20 ppm Ru           |      |         | 3 h    | 42.4% |
|        |                    |       |                     |      |         | 4 h    | 50.5% |
|        |                    |       |                     |      |         | 5 h    | 52.0% |
|        |                    |       |                     |      |         | 19.5 h | 72.6% |

| No.   | time   | Mn    | Mw     | PDI  |
|-------|--------|-------|--------|------|
| Ex.8  | 5 h    | 83938 | 280569 | 3.34 |
| Ex.9  | 1.75 h | 88227 | 272329 | 3.09 |
| Ex.10 | 21 h   | 88443 | 294230 | 3.33 |
| Ex.11 | 19.5 h | 81814 | 319221 | 3.90 |

TABLE E.6

Inventive Examples with catalyst (c), RuHCl(CO)(IMes)(PCy$_3$), in 2 L reactor, 12% NBR concentration

|       | NBR solution       |       | Catalyst solution |      |         |       | Hydrogenation |
|-------|--------------------|-------|-------------------|------|---------|-------|---------------|
| No.   | NBR                | MCB   | catalyst (c)      | MCB  | Temp.   | Time  | degree        |
| Ex.12 | Perbunan ® 3431VP, | 619 g | 27 mg,            | 42 g | 138° C. | 0.5 h | 46.2%         |
|       | 90 g               |       | 0.03 phr,         |      |         | 1 h   | 62.1%         |
|       |                    |       | 41 ppm            |      |         | 2 h   | 82.5%         |
|       |                    |       | Ru                |      |         | 3 h   | 92.3%         |
|       |                    |       |                   |      |         | 4 h   | 96.0%         |
|       |                    |       |                   |      |         | 5 h   | 97.0%         |
| Ex.13 | Perbunan ® 3431F,  | 619 g | 27 mg,            | 42 g | 138° C. | 1 h   | 87.2%         |
|       | 90 g               |       | 0.03 phr,         |      |         | 2 h   | 98.6%         |
|       |                    |       | 41 ppm            |      |         | 3 h   | 99.2%         |
|       |                    |       | Ru                |      |         |       |               |
| Ex.14 | Perbunan ® 3431F,  | 619 g | 18 mg,            | 42 g | 138° C. | 0.5 h | 62.9%         |
|       | 90 g               |       | 0.02 phr,         |      |         | 1 h   | 80.1%         |
|       |                    |       | 27 ppm            |      |         | 2 h   | 94.6%         |
|       |                    |       | Ru                |      |         | 3 h   | 97.7%         |

| No.   | time | Mn    | Mw     | PDI  |
|-------|------|-------|--------|------|
| Ex.12 | 5 h  | 92745 | 297592 | 3.21 |
| Ex.13 | 3 h  | 90836 | 290051 | 3.19 |
| Ex.14 | 3 h  | 94981 | 300803 | 3.17 |

TABLE E.7

Inventive Examples with cat. (d), RuHCl(CO)(SIMes)(PCy$_3$), in 600 mL reactor, 5.7 wt % NBR concentration

|       | NBR solution       |       | Cat. solution |      |         |       | Hydrogenation |
|-------|--------------------|-------|---------------|------|---------|-------|---------------|
| No.   | NBR                | MCB   | cat. (d)      | MCB  | Temp    | Time  | degree        |
| Ex.15 | Perbunan ® 3431VP, | 282 g | 5.4 mg,       | 17 g | 138° C. | 0.5 h | 51.7%         |
|       | 18 g               |       | 0.03 phr,     |      |         | 1 h   | 64.0%         |
|       |                    |       | 41 ppm        |      |         | 2 h   | 81.8%         |
|       |                    |       | Ru            |      |         | 3 h   | 89.5%         |
|       |                    |       |               |      |         | 4 h   | 93.3%         |
|       |                    |       |               |      |         | 5 h   | 95.3%         |

| No    | time | Mn    | Mw     | PDI  |
|-------|------|-------|--------|------|
| Ex.15 | 5 h  | 86528 | 272098 | 3.14 |

TABLE E.8

Inventive Examples with cat. (e), RuHCl(CO)(IMes)(PPh$_3$), in 600 mL reactor, 5.7 wt % NBR concentration

| No. | NBR solution | | Cat. solution | | Temp. | Time | Hydrogenation degree |
|---|---|---|---|---|---|---|---|
| | NBR | MCB | cat. (e) | MCB | | | |
| Ex.16 | Perbunan ® 3431VP, 18 g | 282 g | 5.4 mg, 0.03 phr, 41 ppm Ru | 17 g | 138° C. | 0.5 h | 47.4% |
| | | | | | | 1 h | 60.0% |
| | | | | | | 2 h | 66.0% |
| | | | | | | 3 h | 75.2% |
| | | | | | | 4 h | 80.1% |
| | | | | | | 5 h | 83.8% |

| No. | time | Mn | Mw | PDI |
|---|---|---|---|---|
| Ex.16 | 5 h | 82678 | 282648 | 3.42 |

TABLE E.9

Inventive Examples with cat. (f), RuHCl(CO)(SIMes)(PPh$_3$), in 600 mL reactor, 5.7 wt % NBR concentration

| No. | NBR solution | | Cat. solution | | Temp. | Time | Hydrogenation degree |
|---|---|---|---|---|---|---|---|
| | NBR | MCB | cat. (f) | MCB | | | |
| Ex.17 | Perbunan ® 3431VP, 18 g | 282 g | 5.4 mg, 0.03 phr, 41 ppm Ru | 17 g | 138° C. | 1 h | 70.8% |
| | | | | | | 2 h | 81.9% |
| | | | | | | 3 h | 88.3% |
| | | | | | | 4 h | 90.4% |
| | | | | | | 5 h | 93.5% |

| No. | time | Mn | Mw | PDI |
|---|---|---|---|---|
| Ex.17 | 5 h | 87837 | 286373 | 3.26 |

TABLE E.10

Inventive Examples with cat. (g), RuHCl(CO)(IPr)(PPh$_3$), in 2 L reactor, 12 wt % NBR concentration

| No. | NBR solution | | Cat. solution | | Temp. | Time | Hydrogenation degree |
|---|---|---|---|---|---|---|---|
| | NBR | MCB | cat (g) | MCB | | | |
| Ex.18 | Perbunan ® 3431F, 90 g | 619 g | 27 mg, 0.03 phr, 41 ppm Ru | 42 g | 138° C. | 0.5 h | 41.6% |
| | | | | | | 2 h | 55.6% |
| | | | | | | 3 h | 58.5% |
| | | | | | | 4 h | 59.0% |

| No. | time | Mn | Mw | PDI |
|---|---|---|---|---|
| Ex.18 | 4 h | 89877 | 293889 | 3.27 |

TABLE E.11

Inventive Examples with cat. (h), RuHCl(CO)(IPr)(PCy$_3$), in 600 mL reactor, 12 wt % NBR concentration

| No. | NBR solution | | Cat. solution | | Temp | Time | Hydrogenation degree |
|---|---|---|---|---|---|---|---|
| | NBR | MCB | cat. (h) | MCB | | | |
| Ex.19 | Perbunan ® 3431F, 36 g | 248 g | 10.8 mg, 0.03 phr, 41 ppm Ru | 18 g | 138° C. | 0.5 h | 15.8% |
| | | | | | | 1 h | 34.1% |
| | | | | | | 2 h | 53.0% |
| | | | | | | 3 h | 62.8% |

TABLE E.11-continued

Inventive Examples with cat. (h), RuHCl(CO)(IPr)(PCy$_3$), in 600 mL reactor, 12 wt % NBR concentration

|       |      |        | 4 h     | 68.8% |
|-------|------|--------|---------|-------|
|       |      |        | 5 h     | 73.3% |

| No    | time | Mn     | Mw      | PDI   |
|-------|------|--------|---------|-------|
| Ex.19 | 5 h  | 84,573 | 273,008 | 3.23  |

TABLE E.12

Inventive Examples with cat. (i), RuHCl(CO)(ItBu)(PCy$_3$), in 600 mL reactor, 12 wt % NBR concentration

| No. | NBR solution | | Cat. solution | | | | Hydrogenation |
|---|---|---|---|---|---|---|---|
|   | NBR | MCB | cat. (i) | MCB | Temp. | Time | degree |
| Ex.20 | Perbunan ® 3431F, 36 g | 248 g | 10.8 mg, 0.03 phr, 41 ppm Ru | 18 g | 138° C. | 0.5 h | 24.5% |
|   |   |   |   |   |   | 1 h | 32.4% |
|   |   |   |   |   |   | 2 h | 45.3% |
|   |   |   |   |   |   | 3 h | 59.0% |
|   |   |   |   |   |   | 4 h | 68.4% |
|   |   |   |   |   |   | 5 h | 74.3% |

| No.   | time | Mn     | Mw      | PDI  |
|-------|------|--------|---------|------|
| Ex.20 | 5 h  | 86,290 | 262,809 | 3.05 |

TABLE E.13

Inventive Examples with cat. (c), RuHCl(CO)(IMes)(PCy$_3$), in 2 L reactor, 12 wt % NBR concentration, Krynac ® 4450F as the feedstock

| No. | NBR solution | | Cat. solution | | | | Hydrogenation |
|---|---|---|---|---|---|---|---|
|   | NBR | MCB | cat. (c) | MCB | Temp. | Time | degree |
| Ex.21 | Krynac ® 4450F, 90 g | 619 g | 27 mg, 0.03 phr, 41 ppm Ru | 42 g | 138° C. | 0.5 h | 44.3% |
|   |   |   |   |   |   | 1 h | 69.0% |
|   |   |   |   |   |   | 2 h | 87.2% |
|   |   |   |   |   |   | 3 h | 93.8% |
|   |   |   |   |   |   | 4 h | 96.5% |

| No    | time | Mn     | Mw      | PDI  |
|-------|------|--------|---------|------|
| Ex.21 | 4 h  | 90,339 | 208,514 | 2.31 |

TABLE E.14

Inventive Examples with cat. (c), RuHCl(CO)(IMes)(PCy$_3$), in 2 L reactor, 12 wt % NBR concentration, Krynac ® X 740 as the feedstock

| No. | NBR solution | | Cat. solution | | | | Hydrogenation |
|---|---|---|---|---|---|---|---|
|   | NBR | MCB | cat. (c) | MCB | Temp. | Time | degree |
| Ex.22 | Krynac ® X 740, 90 g | 619 g | 27 mg, 0.03 phr, 41 ppm Ru | 42 g | 138° C. | 0.5 h | 40.9% |
|   |   |   |   |   |   | 1 h | 62.1% |
|   |   |   |   |   |   | 2 h | 83.8% |
|   |   |   |   |   |   | 3 h | 92.3% |
|   |   |   |   |   |   | 4 h | 94.4% |

| No.   | time | Mn      | Mw      | PDI  |
|-------|------|---------|---------|------|
| Ex.22 | 4 h  | 115,567 | 293,596 | 2.54 |

The above examples clearly show that the catalysts according to general formula (I) are much more active in the hydrogenation of nitrile rubber than the well known Wilkinson catalyst Rh(PPh$_3$)$_3$Cl or the structurally closest catalyst RuHCl(CO)(PCy$_3$)$_2$. This leads to recognizably reduced costs for carrying out the hydrogenation process. It is also shown that in view of the low amounts of the catalyst required a recovery process for the catalyst or the catalyst metal—although possible by solution scrubbing with resins—is in fact not necessary. Due to the long term lower costs for Ruthenium compared to other possible metals for the hydrogenation of nitrile rubber such as Palladium, Rhodium and Iridium and due to the simple synthetic preparation of the catalysts a clear cost advantage is achieved.

It is further shown that the catalysts within the scope of general formula (I) may be operated in a broad temperature range from 120 to 145° C. at least which is beneficial for easy removal of the heat generated during hydrogenation and also to keep solution viscosities in a manageable range. Namely the catalyst RuHCl(CO)(IMes)(PCy$_3$) can be operated at least at 145° C. This is somewhat surprising as the IMes ligand actually comprises an imidazole ring which is generally known as not being very stable at higher temperatures.

Looking at the molecular weights after hydrogenation for different reaction conditions such as catalyst loadings and reaction temperatures the results obtained with the inventive hydrogenation process are relatively similar. Compared to the starting NBR rubber the Mn and Mw values are just approx. 15% higher.

As for the nitrile rubber substrate no special requirements are needed in order to successfully perform the hydrogenation. This means that commercially available nitrile rubber grades prepared by using standard emulsifier systems such as fatty acid soaps, rosin soaps, sulfonate or sulfate emulsifiers and standard redox activations systems can be used. As there are no further special requirements for the manufacture of the NBR other than just ensuring a usability in standard NBR compounding operations a very broad range of commercially available NBR rubber can be easily converted into hydrogenated nitrile rubber allowing to provide a much broader choice grade as currently available.

Although all catalysts employed in the experimental section contain phosphine ligands it is not needed to add further amounts of phosphine for a successful hydrogenation of nitrile rubber unlike the Wilkinson catalyst which clearly needs added $PPh_3$.

It is surprising that molecular weight degradation has not been observed here although the NHC-ligands used here are formally of carbene type and therefore prone to metathetic reactions often leading to molecular weight reduction. A mechanistic explanation cannot be given here except that the NHC-ligands present in the catalysts of general formula (I) are known to be good electron donors with little backbonding capability. That tends to lower the bond order below 2 closer to 1 which disfavors metathesis reactions. It is furtheron surprising that no excessive viscosity increase or gelling is taking place during the hydrogenation reaction as often observed with other catalysts of the prior art.

F Properties

F.1 Mooney Viscosity Before and after Aging

Mooney viscosity (ML1+4 at 100° C.) of the HNBR samples obtained after the hydrogenation process according to the invention was measured in accordance with ASTM standard D 1646. Additionally the heat stability of such HNBR samples was examined for the larger scale examples in the 2 L reactor by subjecting the samples to aging in air at 140° C. for four days.

Table F1 shows that the process of the present invention using a catalyst in accordance with general formula (I) allows to provide HNBR with a less pronounced Mooney increase upon aging than with a hydrogenation not in accordance with the present invention using catalysts, in particular the catalyst (b) as closest catalyst of the prior art (CEx.3).

TABLE F1

| Sample | RDB (%) | ML(1 + 4 at 100° C.) | | ΔML | Remark | |
| | | before ageing | after ageing | | NBR feedstock | obtained by hydrogenation using as catalyst |
|---|---|---|---|---|---|---|
| CEx.3 | 2.5 | 118 | 162 | 44 | Perbunan ® 3431VP | cat (b), 0.05 phr, Ru 70 ppm |
| Ex.9 | 0.2 | 86 | 116 | 30 | Perbunan ® 3431VP | cat (c), 0.052 phr, Ru 70 ppm |
| Ex.12 | 3.0 | 92 | 121 | 29 | Perbunan ® 3431VP | cat (c), 0.03 phr, Ru 41 ppm |
| Ex.13 | 0.8 | 81 | 117 | 36 | Perbunan ® 3431F | cat (c), 0.03 phr, Ru 41 ppm |
| Ex.14 | 2.3 | 85 | 127 | 42 | Perbunan ® 3431F | cat (c), 0.02 phr, Ru 27 ppm |

F.2 Gel Content

The gel content in the obtained HNBR samples can be found in the following Table F2. Comparing the HNBRs prepared in accordance with the present invention with the HNBR of the comparison examples it becomes clear that the process of the present invention allows to provide HNBR with a substantially lower amount of gel.

TABLE F2

| No. | Catalyst | Gel content in the rubber |
|---|---|---|
| CEx. 5 | cat. (a) (0.06 phr, Rh 67 ppm) | 0.8% |
| CEx. 3 | cat. (b) (0.05 phr, Ru 70 ppm) | 3.2% |

TABLE F2-continued

| No. | Catalyst | Gel content in the rubber |
|---|---|---|
| Ex. 8 | cat. (c) (0.03 phr, Ru 41 ppm) | 0.5% |
| Ex. 9 | cat. (c) (0.052 phr, Ru 70 ppm) | 0.5% |
| Ex. 10 | cat. (c) (0.02 phr, Ru 27 ppm) | 0.5% |

F.3 Benzene Concentration

The benzene concentration in the HNBR solution was measured before and after hydrogenation. The results can be found in below Table F3. Such concentration implicitly indicates the amount of HCl generated. HNBR solutions prepared with the process of the present invention shows a much lower benzene concentration than HNBR solutions not prepared according to the process of the present invention. Therefore, less corrosive HCl can be generated and HNBR with a correspondingly small benzene content can be obtained by isolation.

TABLE F3

| No. | Catalyst | Benzene content in the HNBR solution |
|---|---|---|
| CEx. 1 | cat. (a) (0.037 phr, Rh 41 ppm) | 528 ppm |
| CEx. 5 | cat. (a) (0.06 phr, Rh 67 ppm) | 348 ppm |
| Ex. 4 | cat. (c) (0.03 phr, Ru 41 ppm) | 88 ppm |
| Ex. 12 | cat. (c) (0.03 phr, Ru 41 ppm) | 85 ppm |

What is claimed is:

1. A process for preparing partially or fully hydrogenated nitrile rubbers, the process comprising subjecting a nitrile rubber to hydrogenation in the presence of at least one complex catalyst having the general formula (I)

$$Ru(CO)(H)(X^1)(L)(L^1) \quad (I)$$

wherein
$X^1$ is an anionic ligand, and
either:
(i) L represents a N-heterocyclic carbene ligand, and
$L^1$ represents a phosphine having the general formula (IIf)

(IIf)

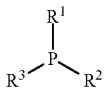

wherein

R$^1$, R$^2$ and R$^3$ are identical or different, and represent C$_1$-C$_{20}$ alkyl, C$_3$-C$_8$-cycloalkyl, C$_1$-C$_{20}$ alkoxy, C$_6$-C$_{20}$ aryloxy, C$_2$-C$_{20}$ heteroaryl with at least one heteroatom in the cycle, a C$_2$-C$_{20}$ heterocyclyl group with at least one heteroatom in the cycle, or halogen; or (ii) both ligands L$^1$ and L$^2$ represent an identical or different N-heterocyclic carbene ligand.

2. The process according to claim 1, wherein the N-heterocyclic carbene ligand is a cyclic carbene ligand with at least one nitrogen as hetero atom being present in the ring, and wherein such N-heterocyclic carbene ligand can be unsubstituted or substituted with one or more substituents.

3. The process according to claim 2, wherein the N-heterocyclic carbene ligand has a structure corresponding to the general formulae (IIa) to (IIe)

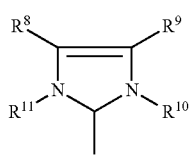 (IIa)

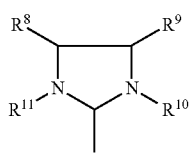 (IIb)

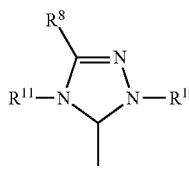 (IIc)

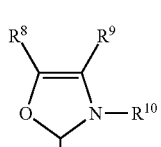 (IId)

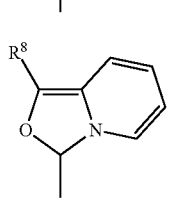 (IIe)

wherein

R$^8$, R$^9$, R$^{10}$ and R$^{11}$ are identical or different and represent hydrogen, straight-chain or branched C$_1$-C$_{30}$-alkyl, C$_3$-C$_{20}$-cycloalkyl, C$_2$-C$_{20}$-alkenyl, C$_2$-C$_{20}$-alkynyl, C$_6$-C$_{24}$-aryl, C$_7$-C$_{25}$-alkaryl, C$_2$-C$_{20}$ heteroaryl, C$_2$-C$_{20}$ heterocyclyl, C$_1$-C$_{20}$-alkoxy, C$_2$-C$_{21}$-alkenyloxy, C$_2$-C$_{20}$-alkynyoxy, C$_6$-C$_{20}$-aryloxy, C$_2$-C$_{20}$-alkoxycarbonyl, C$_1$-C$_{20}$-alkylthio, C$_6$-C$_{20}$-arylthio, —Si(R)$_3$, —O—Si(R)$_3$, —O—C(=O)R, C(=O)R, —C(=O)N(R), —NR—C(=O)—N(R)$_2$, —SO$_2$N(R)$_2$, —S(=)R, —S(=O)$_2$R, —O—S(=O)$_2$R, halogen, nitro or cyano; wherein in all above occurrences relating to the meanings of R$^8$, R$^9$, R$^{10}$ and R$^{11}$ the group R is identical or different and represents hydrogen, alkyl, cycloalkyl, alkenyl, alkynyl, aryl or heteroaryl and wherein one or more of R$^8$, R$^9$, R$^{10}$ and R$^{11}$ can independently of one another, be substituted by one or more substituents, and a functional group selected from the group consisting of hydroxy, thiol, thioether, ketone, aldehyde, ester, ether, amine, imine, amide, nitro, carboxylic acid, disulphide, carbonate, isocyanate, carbodimide, carboalkoxy, carbamate and halogen, where these abovementioned substituents, to the extent chemically possible, may in turn be substituted by one or more substituents selected from the group consisting of halogen, C$_1$-C$_5$-alkyl, C$_1$-C$_5$-alkoxy and phenyl.

4. The process according to claim 3, wherein the N-heterocyclic carbene ligand has a structure corresponding to the general formulae (IIa) to (IIe) wherein R$^8$ and R$^9$ are identical or different and represent hydrogen, C$_6$-C$_{24}$-aryl, straight-chain or branched C$_1$-C$_{10}$-alkyl, or form a cycloalkyl or aryl structure together with the carbon atoms to which they are bound, and R$^{10}$ and R$^{11}$ are identical or different and represent straight-chain or branched C$_1$-C$_{10}$-alkyl, C$_3$-C$_{10}$-cycloalkyl, substituted or unsubstituted C$_6$-C$_{24}$-aryl.

5. The process according to claim 3, wherein the N-heterocyclic carbene ligand has a structure corresponding to formulae (IIIa) to (IIIu), where "Ph" means in each case phenyl, "Bu" means either n-butyl, sec.-butyl, iso-butyl or tert.-butyl, "Mes" represents in each case 2,4,6-trimethylphenyl, "Dipp" means in all cases 2,6-diisopropylphenyl and "Dimp" means 2,6-dimethylphenyl

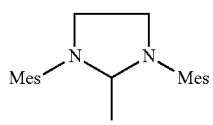 (IIIa)

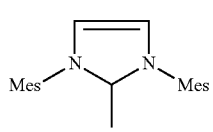 (IIIb)

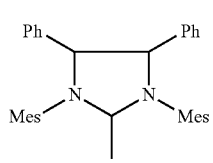 (IIIc)

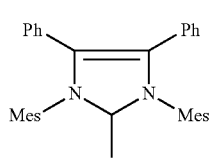 (IIId)

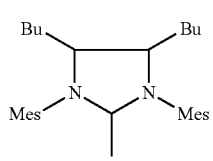 (IIIe)

-continued (IIIf) 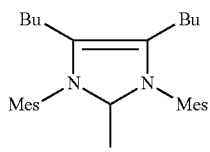

(IIIg) 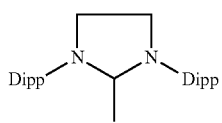

(IIIh) 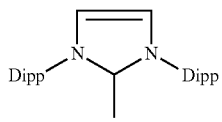

(IIIj) 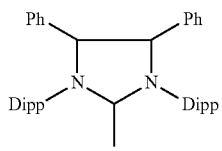

(IIIk) 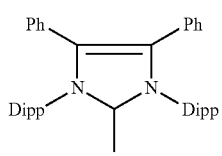

(IIIm) 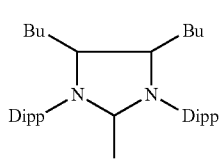

(IIIn) 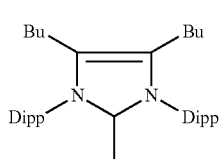

(IIIp) 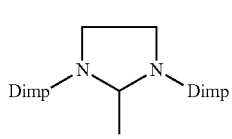

(IIIq) 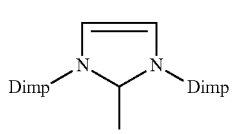

(IIIr) 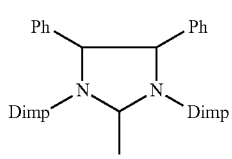

(IIIs) 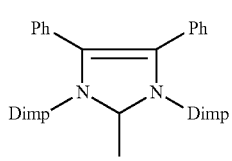

-continued (IIIt) 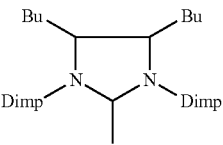

(IIIu) 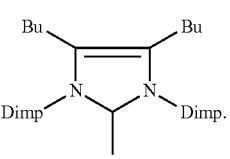

6. The process according to claim 1, wherein $X^1$ represents hydrogen, halogen, pseudohalogen, straight-chain or branched $C_1$-$C_{30}$-alkyl, $C_6$-$C_{24}$-aryl, $C_1$-$C_{20}$-alkoxy, $C_6$-$C_{24}$-aryloxy, $C_3$-$C_{20}$-alkyldiketonate, $C_6$-$C_{24}$-aryldiketonate, $C_1$-$C_{20}$-carboxylate, $C_1$-$C_{20}$-alkylsulfonate, $C_6$-$C_{24}$-arylsulfonate, $C_1$-$C_{20}$-alkythiol, $C_6$-$C_{24}$-arylthiol, $C_1$-$C_{20}$-alkylsulfonyl or $C_1$-$C_{20}$-alkylsulfinyl, and wherein all aforementioned moieties can be unsubstituted or also be substituted by one or more further substituents, selected from the group consisting of halogen, $C_1$-$C_{10}$-alkyl, $C_1$-$C_{10}$-alkoxy or $C_6$-$C_{24}$-aryl, and where these substituents may in turn also be substituted by one or more substituents selected from the group consisting of halogen, $C_1$-$C_5$-alkyl, $C_1$-$C_5$-alkoxy and phenyl.

7. The process according to claim 1, wherein $X^1$ represents chlorine, $CF_3COO$, $CH_3COO$, $CFH_2COO$, $(CH_3)_3CO$, $(CF_3)_2(CH_3)CO$, $(CF_3)(CH_3)_2CO$, phenoxy, methoxy, ethoxy, p-$CH_3$—$C_6H_4$—$SO_3$, $CH_3SO_3$ or $CF_3SO_3$.

8. The process according to claim 1, wherein a catalyst of formulae (I-c) is used

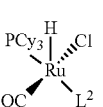 (I-c)

wherein $L^2$ represents a ligand of the general formulae (IIa) or (IIb)

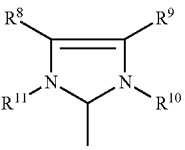 (IIa)

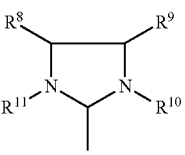 (IIb)

wherein
$R^8$ and $R^9$ are identical or different and represent hydrogen, $C_6$-$C_{24}$-aryl, straight-chain or branched $C_1$-$C_{10}$-alkyl, or form a cycloalkyl or aryl structure together with the carbon atoms to which they are bound, and
$R^{10}$ and $R^{11}$ are identical or different and represent straight-chain or branched $C_1$-$C_{10}$-alkyl, $C_3$-$C_{10}$-cycloalkyl, substituted or unsubstituted $C_1$-$C_{24}$-aryl, $C_1$-$C_{10}$-alkylsulfonate, or $C_5$-$C_{10}$-arylsulfonate, or wherein $L^2$ represents a ligand of the general formulae (IIIa) to (IIIu) where "Ph" means in each case phenyl, "Bu" means in each case butyl, "Mes" represents in each case 2,4,6-trimethylphenyl, "Dipp" means in all cases 2,6-diisopropylphenyl and "Dimp" means in each case 2,6-dimethylphenyl

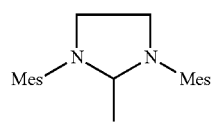
(IIIa)

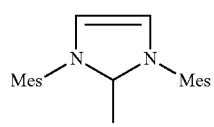
(IIIb)

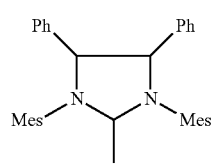
(IIIc)

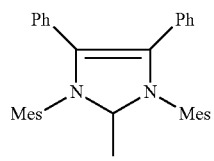
(IIId)

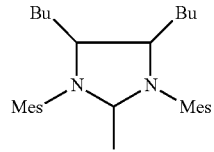
(IIIe)

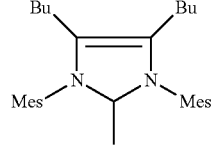
(IIIf)

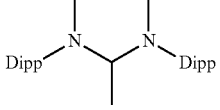
(IIIg)

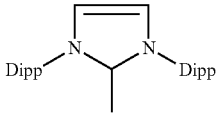
(IIIh)

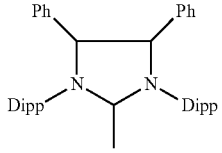
(IIIj)

-continued

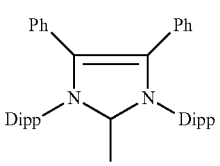
(IIIk)

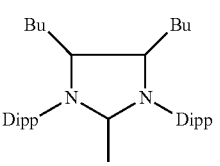
(IIIm)

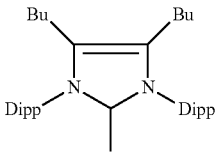
(IIIn)

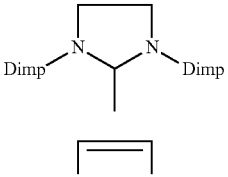
(IIIp)

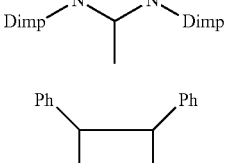
(IIIq)

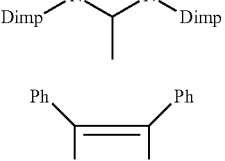
(IIIr)

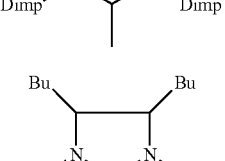
(IIIs)

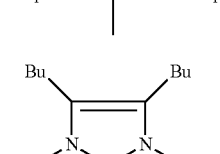
(IIIt)

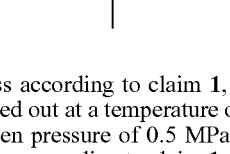
(IIIu)

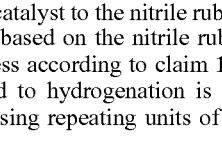

9. The process according to claim 1, wherein the hydrogenation is carried out at a temperature of 60° C. to 200° C., and at a hydrogen pressure of 0.5 MPa to 35 MPa.

10. The process according to claim 1, wherein the amount of the complex catalyst to the nitrile rubber is 1 to 1000 ppm of noble metal, based on the nitrile rubber used.

11. The process according to claim 1, wherein the nitrile rubber subjected to hydrogenation is a copolymer or terpolymer comprising repeating units of (i) at least one α, β-unsaturated nitrile, (ii) at least one conjugated diene, and (iii) optionally one or more further copolymerizable monomers selected from the group consisting of α,β-unsaturated monocarboxylic acids, their esters and amides, α,β-unsaturated dicarboxylic acids, their mono- or diesters and the respective anhydrides or amides of said α,β-unsaturated dicarboxylic acids.

12. The process according to claim 1, wherein $L^1$ is selected from the group consisting of $P(CF_3)_3$, $P(CH_2C_6H_4-SO_3Na)_3$, $P(isopropyl)_3$, $P(CHCH_3(CH_3CH_3))_3$, $P(cyclopentyl)_3$, $P(cyclohexyl)_3$, and $P(neopentyl)$.

13. The process according to claim 12, wherein:

the nitrile rubber comprises repeating units of at least one α, β-unsaturated nitrile, and at least one conjugated diene;

the hydrogenation is carried out at a temperature of 60° C. to 200° C., at a hydrogen pressure of 0.5 MPa to 35 MPa;

$X^1$ represents chlorine, $CF_3COO$, $CS_3COO$, $CFH_2COO$, $(CH_3)_3CO$, $(CF_3)_2(CH)CO$, $(CF_3)(CH_3)_2CO$, phenoxy, methoxy, ethoxy, $p-CH_3-C_6H_4-SO_3$, $CH_3SO_3$ or $CF_3SO_3$; and $L^2$ is an N-heterocyclic carbene ligand having a structure corresponding to formulae (IIIa) to (IIIu), where "Ph" means in each case phenyl, "Bu" means either n-butyl, sec.-butyl, iso-butyl or tert.-butyl, "Mes" represents in each case 2,4,6-trimethylphenyl, "Dipp" means in all cases 2,6-diisopropylphenyl and "Dimp" means 2,6-dimethylphenyl

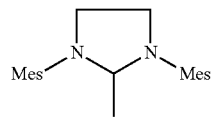

(IIIa)

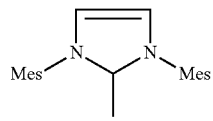

(IIIb)

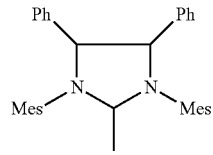

(IIIc)

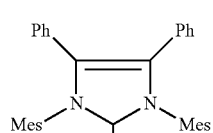

(IIId)

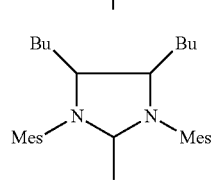

(IIIe)

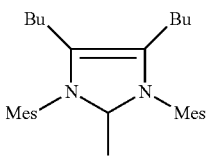

(IIIf)

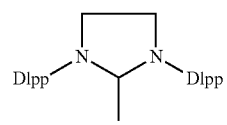

(IIIg)

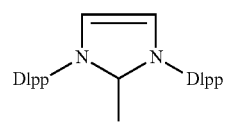

(IIIh)

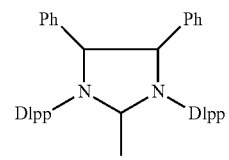

(IIIj)

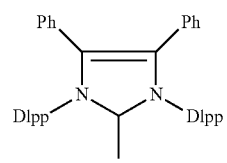

(IIIk)

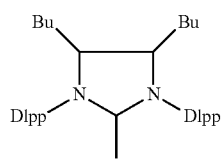

(IIIm)

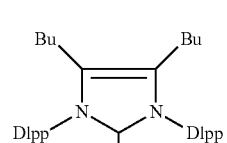

(IIIn)

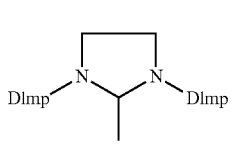

(IIIp)

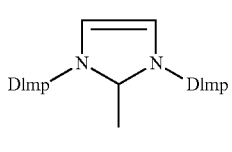

(IIIq)

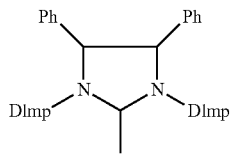

(IIIr)

-continued
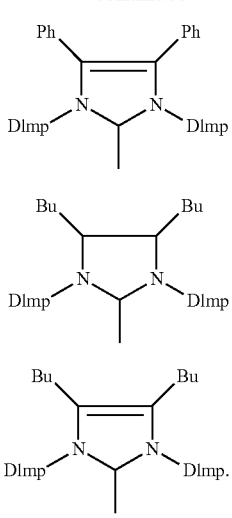
(IIIs)
(IIIt)
(IIIu)
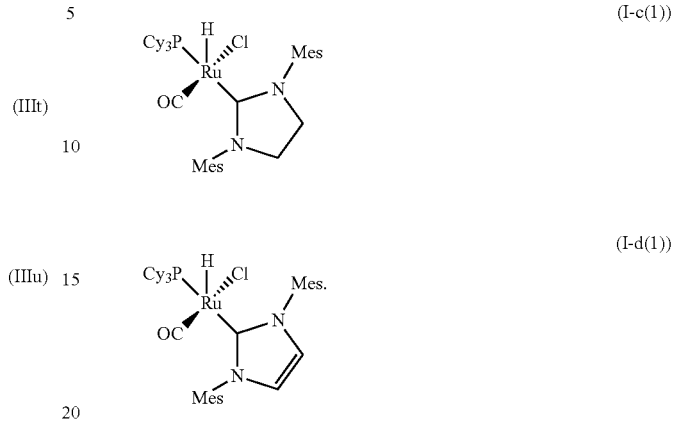
(I-c(1))
(I-d(1))
14. The process according to claim 1, wherein the catalyst is a catalyst according to formulae (I-c(1)) or (I-d(1))
* * * * *